United States Patent
Dubelsten et al.

(12)

(10) Patent No.: US 6,821,614 B1
(45) Date of Patent: Nov. 23, 2004

(54) APPARATUS AND METHOD FOR CONTINUOUS FORMATION OF COMPOSITES HAVING FILLER AND THERMOACTIVE MATERIALS, AND PRODUCTS MADE BY THE METHOD

(75) Inventors: Paul Dubelsten, Tualatin, OR (US); Lorence E. Knowles, Springfield, OR (US); Erik J. Van Kleek, Beaverton, OR (US); Alister Cumming Hume, Surrey (CA); Scott Bradley Gough, Boise, ID (US)

(73) Assignee: Boise Cascade Corporation, Boise, ID (US)

( * ) Notice: Subject to any disclaimer, the term of this patent is extended or adjusted under 35 U.S.C. 154(b) by 0 days.

(21) Appl. No.: 09/336,339

(22) Filed: Jun. 18, 1999

Related U.S. Application Data

(63) Continuation-in-part of application No. 08/988,680, filed on Dec. 11, 1997, now Pat. No. 6,200,682.
(60) Provisional application No. 60/032,690, filed on Dec. 11, 1996.

(51) Int. Cl.[7] .............................................. B32B 27/20
(52) U.S. Cl. ................. 428/298.1; 264/113; 428/300.7; 428/332
(58) Field of Search ................................ 428/409, 364, 428/532, 537.1, 297.4, 298.1, 300.7, 326, 332; 264/112, 113, 115, 122

(56) References Cited

U.S. PATENT DOCUMENTS 3,023,136 A   2/1962   Himmelheber et al.

(List continued on next page.)

FOREIGN PATENT DOCUMENTS

DE   1 453 374   1/1969

(List continued on next page.)

OTHER PUBLICATIONS

English–language translation of Bunzl's German Patent No. 1 453 374, no date available.

(List continued on next page.)

*Primary Examiner*—Mathieu D. Vargot
(74) *Attorney, Agent, or Firm*—Klarquist Sparkman, LLP

(57) ABSTRACT

A method for forming a product from cellulosic material and thermoactive material is described. A mat is formed from a mixture having a predetermined amount of cellulosic material and a predetermined amount of thermoplastic material. The mat is then consolidated and pressed to a predetermined final product thickness. At least a portion of a surface of the mat or product is then surface modified. Consolidating the mixture may include forming a first face layer, forming a core layer on the first face layer, and forming a second face layer on the core layer. Forming the core layer may include depositing mixtures of wood flakes and plastic flakes according to mixture flake size in successive layers such that the core layer has larger flakes adjacent the first face layer and adjacent the second face layer, and smaller flakes in a middle portion of the core layer. The method also can include fusing a sheet of plastic material to at least one surface of the mat, and surface modifying the plastic material. Grafting chemicals can be applied to surface modified mats, plastic material or products. A composite product also is described. One embodiment of the product comprises a first portion having a first core formed from a mixture comprising a cellulosic material and a thermoplastic material, and at least one face layer attached to the first core. The product also comprises a second portion bonded to the first portion. The second portion comprises a second core formed from a mixture comprising a cellulosic material and a thermoplastic material, and at least one face layer attached to the second core.

3 Claims, 18 Drawing Sheets

U.S. PATENT DOCUMENTS

| | | | |
|---|---|---|---|
| 3,995,003 | A | 11/1976 | Potter et al. |
| 3,995,980 | A | 12/1976 | Smith |
| 3,998,580 | A | 12/1976 | Pfiffer |
| 4,094,756 | A | 6/1978 | Taylor |
| 4,131,705 | A | 12/1978 | Kubinsky |
| 4,364,984 | A | 12/1982 | Wentworth |
| 4,379,193 | A | 4/1983 | Hunt |
| 4,416,949 | A | 11/1983 | Gabellieri et al. |
| 4,894,192 | A | 1/1990 | Warych |
| 5,075,057 | A | 12/1991 | Hoedl |
| 5,088,910 | A | 2/1992 | Goforth et al. |
| 5,155,146 | A | 10/1992 | Reetz |
| 5,169,580 | A | 12/1992 | Marcus |
| 5,178,802 | A | 1/1993 | Cree et al. |
| 5,284,546 | A | 2/1994 | Tilby |
| 5,356,278 | A | 10/1994 | Reetz |
| 5,391,438 | A | 2/1995 | Pasternak |
| 5,417,904 | A | 5/1995 | Razi et al. |
| 5,435,954 | A * | 7/1995 | Wold .................. 264/113 |
| 5,441,801 | A | 8/1995 | Deaner et al. |
| 5,474,722 | A | 12/1995 | Woodhams |
| 5,486,553 | A | 1/1996 | Deaner et al. |
| 5,497,594 | A | 3/1996 | Giuseppe et al. |
| 5,516,472 | A | 5/1996 | Laver |
| 5,518,677 | A | 5/1996 | Deaner et al. |
| 5,539,027 | A | 7/1996 | Deaner et al. |
| 5,585,155 | A | 12/1996 | Heikkila et al. |
| 5,718,786 | A | 2/1998 | Lindquist et al. |
| 5,736,218 | A | 4/1998 | Iwata et al. |
| 5,759,680 | A | 6/1998 | Brooks et al. |
| 5,773,138 | A | 6/1998 | Seethamraju et al. |
| 5,824,246 | A | 10/1998 | Reetz |
| 5,827,607 | A | 10/1998 | Deaner et al. |
| 6,136,408 | A * | 10/2000 | Radcliffe et al. ........ 428/537.1 |
| 6,200,682 | B1 | 3/2001 | Dubelsten et al. |

FOREIGN PATENT DOCUMENTS

| | | |
|---|---|---|
| DE | 14 53 374 | 9/1976 |
| DE | 4009883 A | 10/1991 |
| EP | 0 045 216 A | 7/1981 |
| EP | 0 267 516 A | 5/1988 |
| EP | 0 383 572 A | 8/1990 |
| GB | 903499 | 8/1962 |
| JP | 50-757 | 1/1975 |
| WO | WO 95/07808 | 3/1995 |
| WO | WO 95/19995 | 7/1995 |
| WO | WO 95/20006 | 7/1995 |
| WO | WO 95/31318 | 11/1995 |
| WO | WO 98/25744 | 6/1998 |

OTHER PUBLICATIONS

Youngquist et al. "Mechanical and Physical Properties of Air–Formed Wood–Fiber/Polymer–Fiber Composites," *Forest Products Journal*, vol. 42, No. 6, pp. 42–48 (1992).

Lopata et al., "Electron–beam processing of wood fiber–reinforced polypropylene," Tibor Czvikovszky, Hungarian Plastics Research Institute, H–1950 Budapest, Hungary, AECL Research, Whiteshell Laboratories, Pinawa, Manitoba, Canada, pp. 68–74.

Bataille, P., Ricard, L. and Sapieha, S. "Effect of Cellulose Fibers in Polypropylene Composites," *Polymer Composites*, 10(2):103–108 (1989).

Bataille, P., Allard, P., Cousin, P. and Sapieha, S., "Interfacial Phenomena in Cellulose/Polyethylene Composites," *Polymer Composites* 11(5):301–304 (1990).

Cruz–Ramos, C.A., "Natural Fibre Reinforced Thermoplastics. In: Mechanical Properties of Reinforced Thermoplastics," D.W. Clegg and A.A. Collyer eds. Elsevier, *Applied Sci. Publ.*, London, U.K., pp. 65–81 (1986).

Dalvag, H., Klason, C. and Stromvall, H.E., "The Efficiency of Cellulosic Fillers in Common Thermoplastics. Part II. Filling with Processing Aids and Coupling Agents," *Intern. J. Polymeric Mater.* 11:9–38 (1985).

Klason, C., Kubat, J. and Stromvall, H.E., "The Efficiency of Cellulosic Fillers in Common Thermoplastics. Part I. Filling without Processing Aids or Coupling Agents," *Intern. J. Polymeric Mater.* 10:159–187 (1984).

Kokta, B.V., Raj, R.G. and Daneault, C., "Use of Wood Flour as Filler in Polypropylene: Studies on Mechanical Properties," *Polym.–Plast. Technol. Eng.* 28(3):247–259 (1989).

Kokta, B.V., Maldas, D., Daneault, C. and Beland, P., Composites of Polyvinyl Chloride–Wood FIbers. I. Effect of Isocyanate as a Bonding Agent, *Polym. Plast. Technol. Eng.* 29(1/2):87–118 (1990).

Kokta, B.V., Maldas, D., Daneault, C. and Beland, P., "Composites of Poly(Vinyl Chloride) and Wood Fibers. II. Effect of Chemical Treatment," *Polymer Composites* 11(2):84–89 (1990).

Maldas, D. and Kokta, B.V., "Effects of Coating Treatments on the Mechanical Behavior of Wood Fiber–Filled Polystyrene Composites, I. Use of Polyethylene and Isocyanate as Coating Components," *J. Applied Polymer Sci.* 40:917–928 (1990).

Maldas, D. and Kokta, B.V., "Effect of Recycling on the Mechanical Properties of Wood Fiber–Polystyrene Composites. Part 1: Chemithermomechanical Pulp as a Reinforcing Filler," *Polymer Composites* 11(2):77–83 (1990).

Raj, R.G., Kokta, B.V., Maldas, D. and Daneault, C. "Use of Wood Fibers in Thermoplastics. VII. The Effect of Coupling Agents in Polyethylene–Wood Fiber Composites,"0 *J. Applied Polymer Sci.* 37:1089–1103 (1989).

Woodhams, R.T., Thomas, G. and Rodgers, D.K., "Wood Fibers as Reinforcing Fillers for Polyolefins," *Polymer Eng. Sci.* 24(15):1166–1171 (1984).

Zadorecki, P. and Michell, A.J., "Future Prospects for Wood Cellulose as Reinforecment in Organic Polymer Composites," *Polymer Composites* 10(2):69–77 (1989).

Lopata et al., "Electron–beam processing of wood fiber–reinforced polypropylene," Tibor Czvikovszky, Hungarian Plastics Research Institute, H–1950 Budapest, Hungary, AECL Research, Whiteshell Laboratories, Pinawa, Manitoba, Canada, pp. 68–74.

Bataille, P., Ricard, L. and Sapieha, S. "Effect of Cellulose Fibers in Polypropylene Composites," *Polymer Composites*, 10(2):103–108 (1989).

Bataille, P., Allard, P., Cousin, P. and Sapieha, S., "Interfacial Phenomena in Cellulose/Polethylene Composites," *Polymer Composites* 11(5):301–304 (1990).

Cruz–Ramos, C.A., "Natural Fibre Reinforced Thermopalstics, In: Mechanical Properties in Reinforced Thermoplastics," D.W. Clegg and A.A Collyer eds. Elsevier, *Applied Sci. Publ.*, London, U.K., pp. 65–81 (1986).

Dalvag, H., Klason, C. and Stromvall, H.E., "The Efficiency of Cellulosic Fillers in Common Thermoplastics. Part II. Filling with Processing Aids and Coupling Agents," *Intern. J. Polymeric Mater.* 11:9–38 (1985).

Klason, C., Kubat, J. and Stromvall, H.E., "The Efficiency of Cellulose Fillers in Common Thermoplastics Part I. Filling without Processing Aids or Coupling Agents," *Intern. J. Polymeric Mater.* 10:159–187 (1984).

Kokta, B.V., Raj, R.G. and Daneault, C., "Use of Wood Flour as Filler in Polypropylene: Studies on Mechanical Properties," *Polym.–Plast. Technol. Eng.* 28(3):247–259 (1989).

Kokta, B.V., Maldas, D., Daneault, C. and Beland, P., Composites of Polyvinyl Chloride–Wood Fibers, I. Effect of Isocyanate as a Bonding Agent, *Polym. Plast. Technol. Eng.* 29(1/2):87–118 (1990).

Kokta, B.V., Maldas, D., Daneault, C. and Beland. P., "Composites of Poly(Vinyl Chloride) and Wood Fibers. II. Effect of Chemical Treatment," *Polymer Composites* 11(2):84–89 (1990).

Maldas, D. and Kokta, B.V., "Effects of Coating Treatments on the Mechanical Behavior of Wood Fiber–Filled Polystyrene Composites, I. Use of Polyethylene and Isocyanate as Coating Components," *J. Applied Polymer Sci.* 40:917–928 (1990).

Maldas, D. and Kokta, B.V., "Effect of Recycling on the Mechanical Properties of Wood Fiber–Polystyrene Composites: Part 1: Chemithermomechanical Pulp as a Reinforcing Filler," *Polymer Composites* 11(2):77–83 (1990).

Raj, R.G., Kokta, B.V., Maldas, D. and Daneault, C. "Use of Wood Fibers in Thermoplastics. VII. The Effect of Coupling Agents in Polyethylene–Wood Fiber Composites," *J. Applied Polymer Sci.* 37:1089–1103 (1989).

Woodhams, R.T., Thomas, G. and Rodgers, D.K., "Wood Fibers as Reinforcing Fillers for Polyolefins," *Polymer Eng. Sci.* 24(15):1166–1171 (1984).

Zadorecki, P. and Michell, A.J., "Future Prospects for Wood Cellulose as Reinforcement in Organic Polymer Composites," *Polymer Composites* 10(2):69–77 (1989).

* cited by examiner

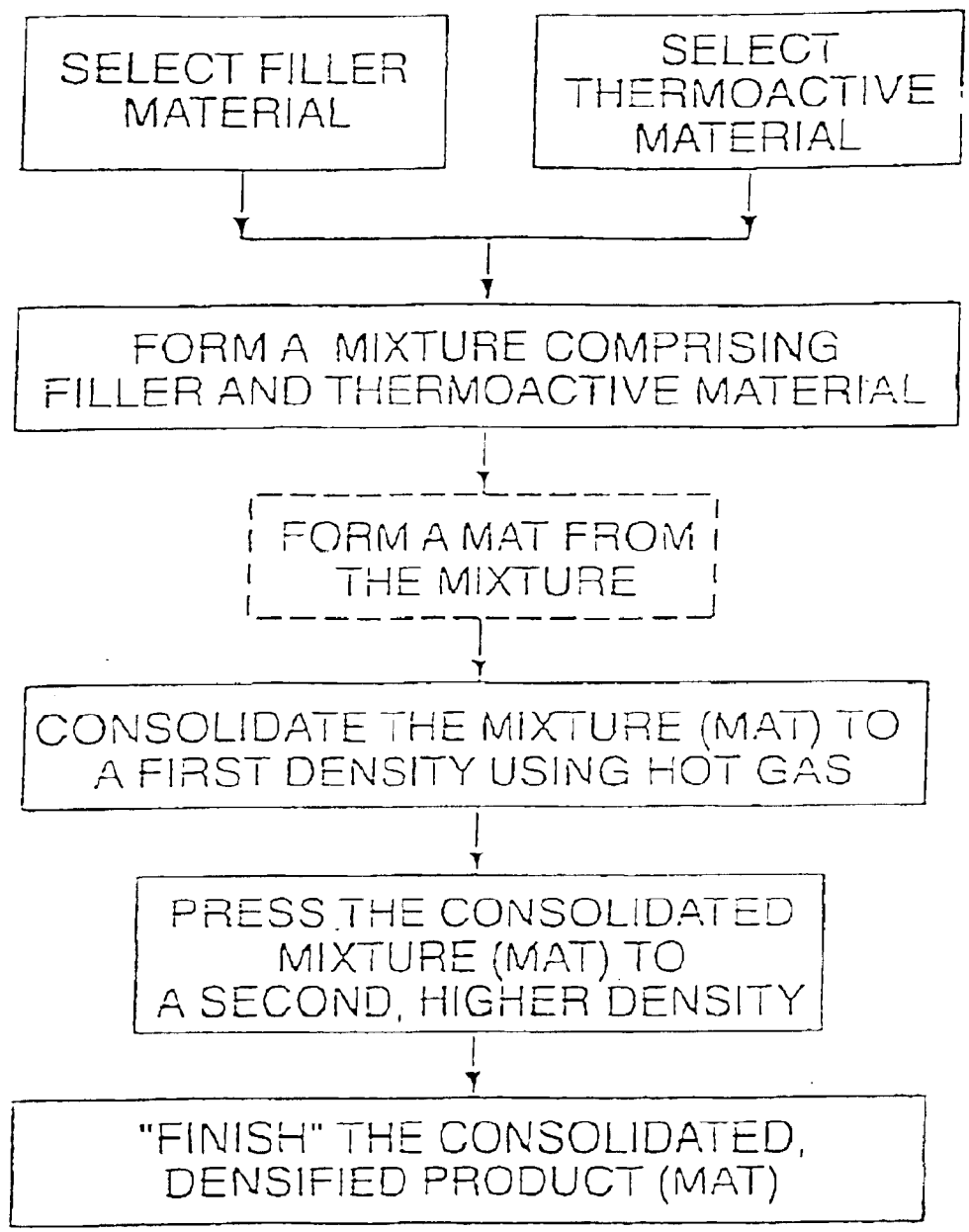

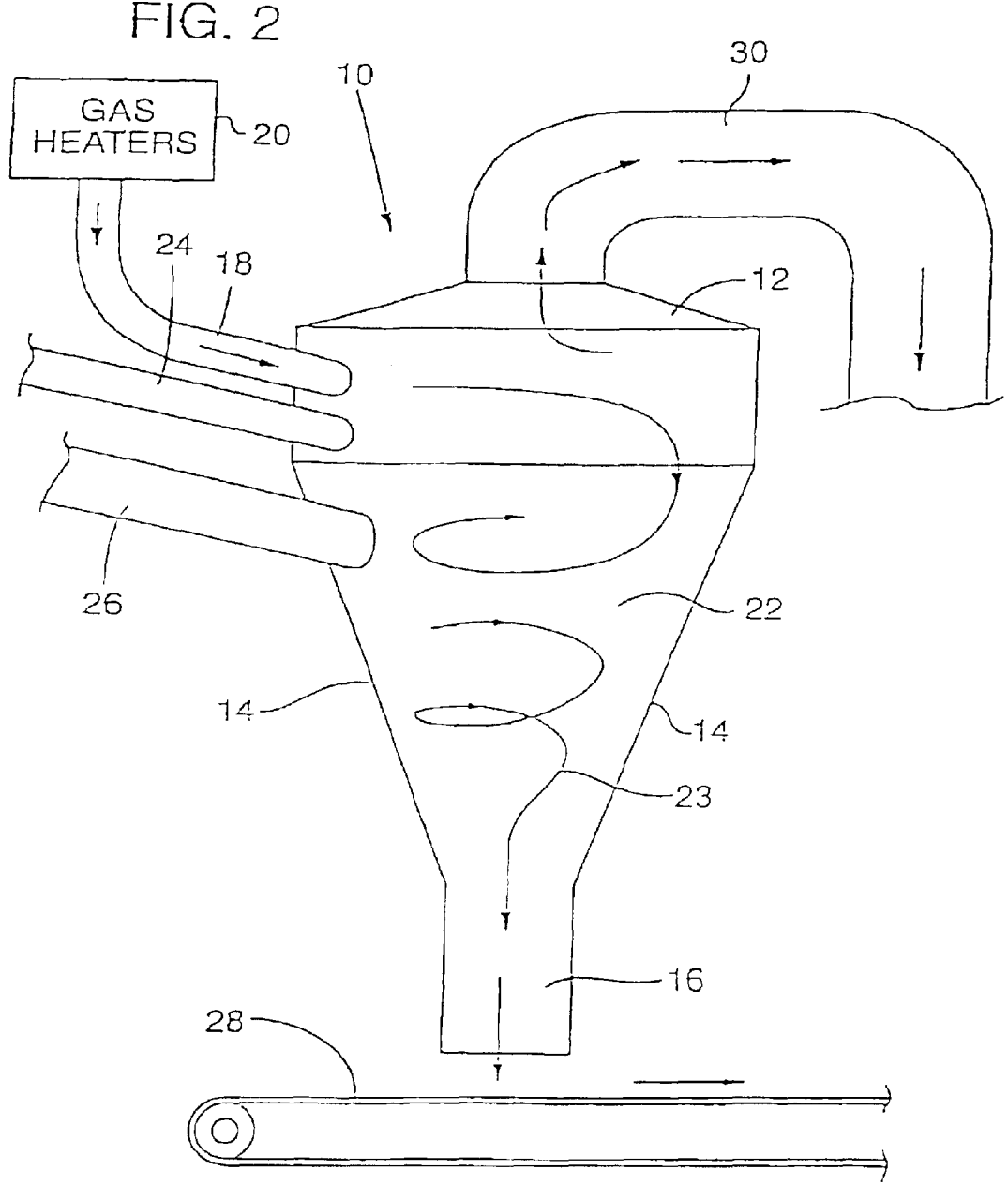

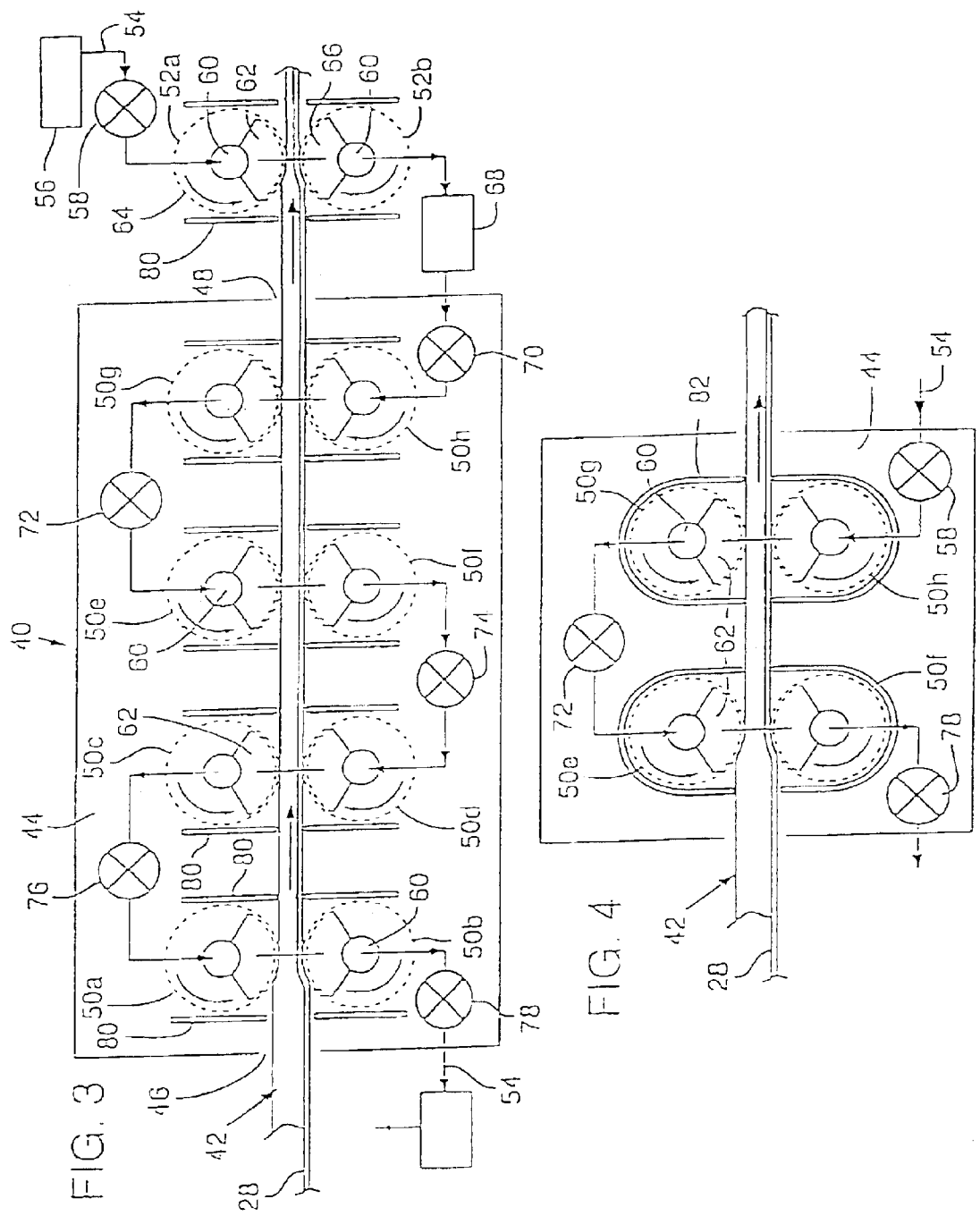

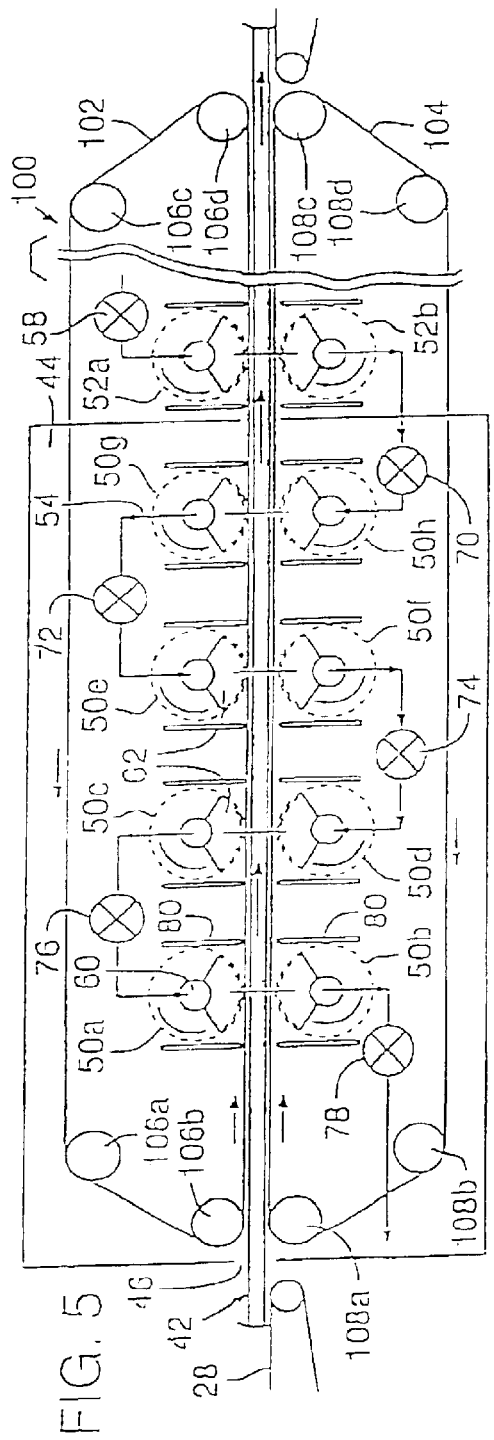
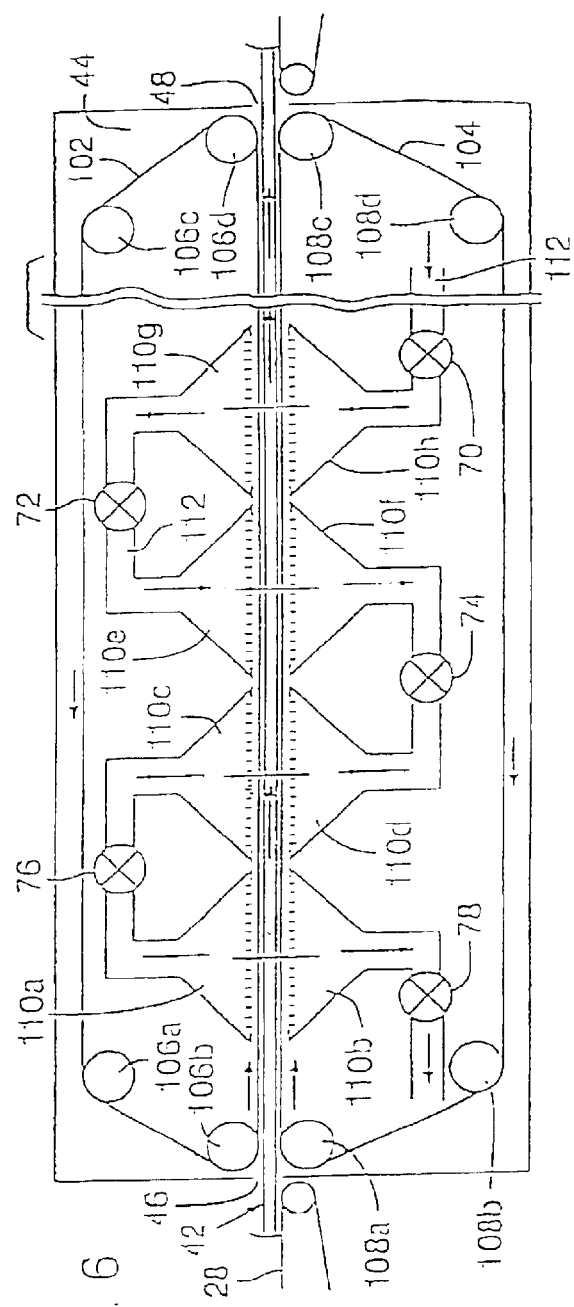
FIG. 5
FIG. 6

FIG. 13
FIG. 14
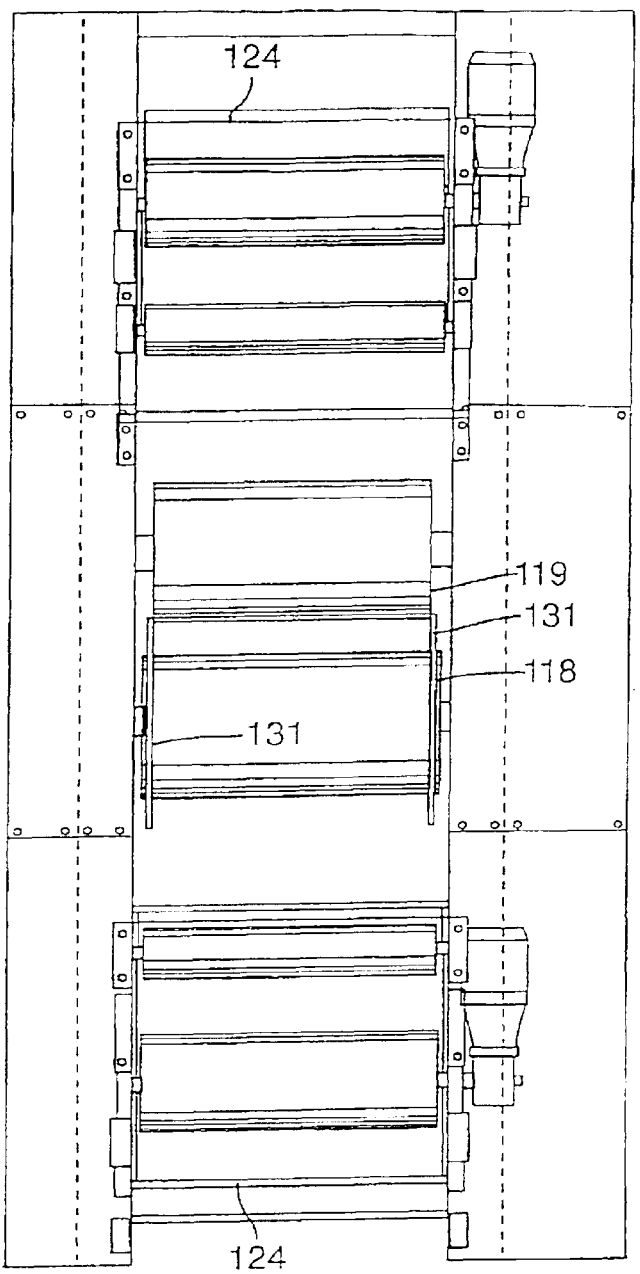
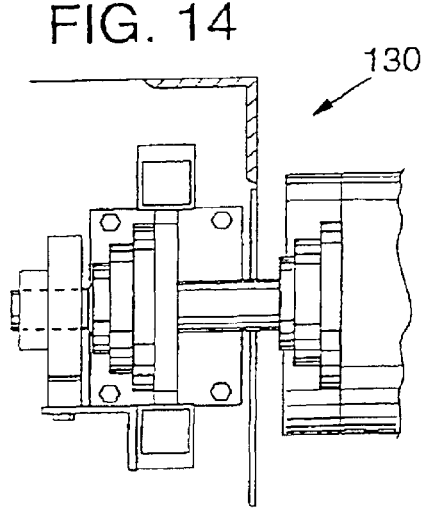

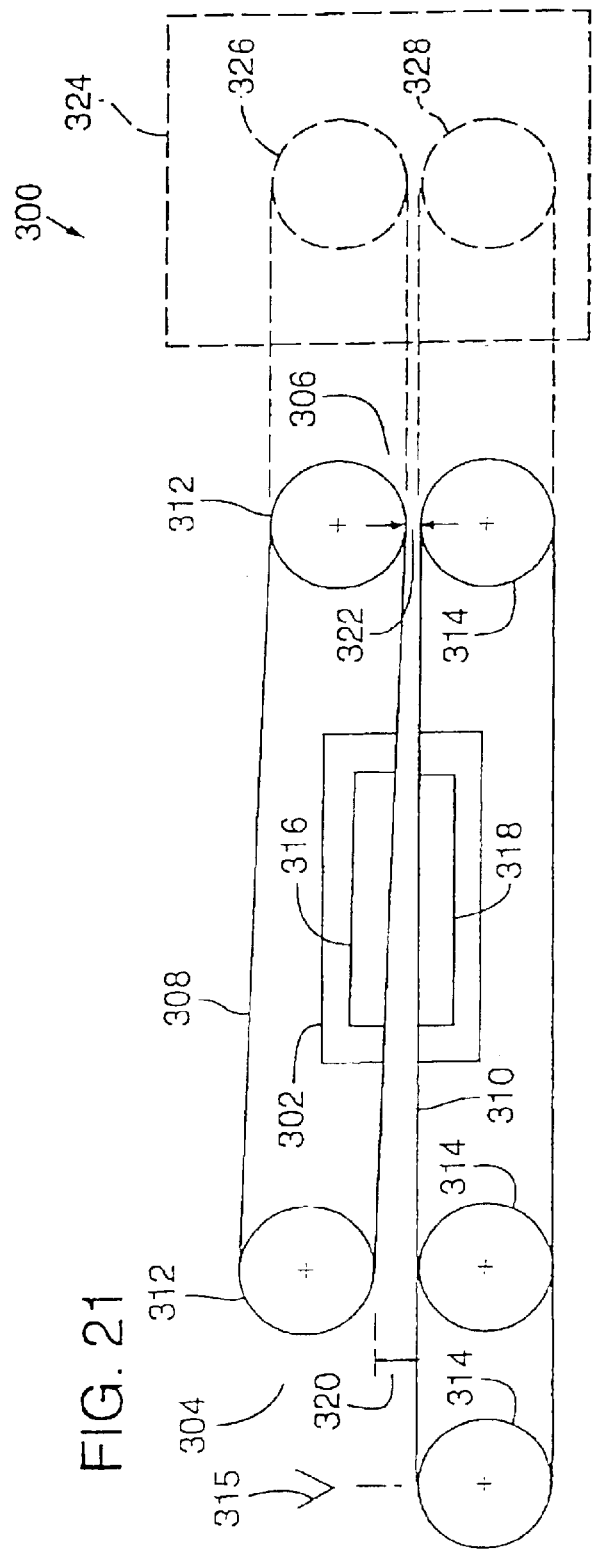
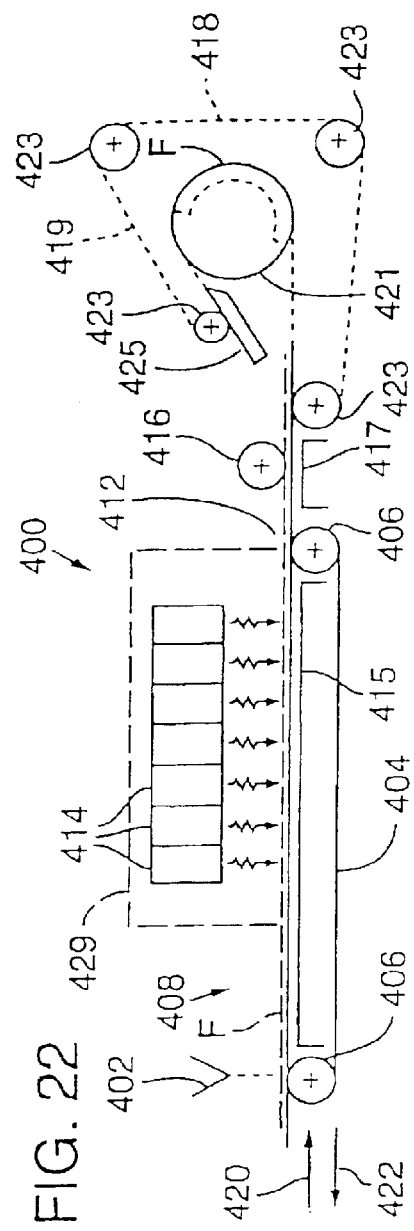
FIG. 21
FIG. 22

APPARATUS AND METHOD FOR CONTINUOUS FORMATION OF COMPOSITES HAVING FILLER AND THERMOACTIVE MATERIALS, AND PRODUCTS MADE BY THE METHOD

CROSS REFERENCE TO RELATED APPLICATION

This application is a continuation-in-part application of copending U.S. patent application Ser. No. 08/988,680, filed on Dec. 11, 1997, now U.S. Pat. No. 6,200,682, which claims benefit of 60/032,690, filed Dec. 11, 1996 which is incorporated herein by reference.

FIELD

This invention concerns an apparatus and method for making composite products, including board products, that includes applying a hot, dry gas to filler and thermoactive materials, particularly cellulosic and thermoplastic materials, in the continuous production of the composites.

BACKGROUND

Products that combine wood materials with thermoplastic materials are known. These products generally are made using batch processes, such as processes that employ heated platens to apply heat and a compression force to the substrate, instead of continuous processes.

Recently, products comprising waste plastics and waste cellulosic materials have been developed, most of which are made by extrusion or injection-die methods. Examples of patented inventions concerning wood/plastic composite products include:

(a) Smith's U.S. Pat. No. 3,995,980, which describes forming mixtures of materials using three separate delivery systems, and thereafter extruding products comprising the mixture;

(b) Goforth et al.'s U.S. Pat. No. 5,088,910, which describes an extrusion process for making synthetic wood products from recycled materials, such as low or high density polyethylene;

(c) Wold's U.S. Pat. No. 5,435,954, which discusses a method for forming wood-plastic composites comprising placing mixtures of such materials in molds and subjecting the mixture to sufficient temperatures to cause the material to occupy the mold and assume its shape; and (d) Reetz' U.S. Pat. Nos. 5,155,146 and 5,356,278, incorporated herein by reference, which describe extrusion apparatuses and processes for processing charges that include expanded thermoplastic materials, such as polystyrene.

There are several disadvantages associated with the inventions discussed above. A principal problem associated with extrusion and injection methods is that the particle size of the materials used to form the composite must be fairly small. Otherwise, the particle size of the composite mixture is too high to be extruded or injection molded efficiently. Moreover, extrusion and injection processes are further limited by the ratio of filler materials, such as wood, to the thermoactive materials that can be used in the charge (i.e., the mixture of filler material and thermoactive material used to form the final product). This puts undesirable constraints on the products that can be produced.

Another problem associated with these prior processes and apparatuses involving heated platens is that they produce products batchwise, instead of continuously. This substantially reduces product throughput. For example, heated platens take too long to heat composites completely throughout their cross section. If the temperature of the platens is increased too much in an effort to speed production, the composite product may burn or scorch, particularly at temperatures above about 400° F. Moreover, many processes that use platen presses require that the platen not only be heated but also cooled during each production cycle. This decreases product throughput and is expensive in view of the energy required to complete the serial heating and cooling steps.

Steam injection processes also can be used to produce composites. However, the initial steam heating stage is followed by continued heating to remove all of the water applied to the composite during the steam injection process. The combination of heating the composite to form products, followed by continued heating to remove water, requires a longer period of time and is more expensive than is desirable in a commercial process.

German Patent No. 14 53 374 (the '374 patent) describes a continuous process for forming composites comprising waste plastic and waste wood. A mixture of waste plastic and waste wood is pressed in the nip between two rollers and hot air is applied to the substrate as it travels around the rollers. The structural features of the apparatus described in the '374 patent are limiting. For example, the '374 patent teaches applying hot gas to only one of the two major opposed surfaces of a substrate at a time. As the substrate passes over one roller gas is applied to one surface, then as the substrate passes over a second roller, hot gas is applied to the opposite surface. There is considerable energy loss, and therefore added expense, as a result of heated gas being vented to the atmosphere after passing through the composite. This also may present a health problem in that vented gas may include volatile organic compounds (VOCs) that present a health risk.

Furthermore, by following the radius of the rollers, the outside surface of the mat is stretched relative to the inside surface. This causes fissures on the outside surface. Such fissures are undesirable when manufacturing a thick product in combination with an outside surface comprised of a fines material (i.e., an outside surface comprised of small particles).

Despite the inventions discussed above, there still is a need for an effective and efficient apparatus and method for continuously forming composite products.

SUMMARY

The present invention overcomes the difficulties of the prior art by providing an effective and efficient composite consolidation apparatus and method for continuously forming composite products comprising filler materials and thermoactive materials. The apparatus and method are particularly suited for forming composites comprising waste cellulosic materials and waste thermoplastics.

One embodiment of the consolidation apparatus includes a hot-gas distribution system having at least one pair of gas cells, more typically plural paired gas cells, such as rollers or hoods, for applying hot air to the charge. A first cell of each pair applies gas to the charge, and generally is referred to as an application roller. The second cell of each pair, referred to as a suction roller, operates at a pressure less than the application roller, i.e., a pressure differential exists between the application roller and the suction roller. Certain embodiments of the apparatus include at least one set of baffles positioned adjacent a cell, at least one shroud positioned about a cell, or at least one set of baffles positioned adjacent a first cell and at least one shroud positioned about a second cell to eliminate or substantially reduce the amount of gas that is vented to the surrounding atmosphere.

The consolidation apparatus can be used in combination with other apparatuses to form a system. One embodiment of the system comprises: (1) a mixer, such as a cyclone, for continuous or batchwise formation of mixtures of filler material and thermoactive material; (2) optionally a prepress for optional densification of the mixture prior to subsequent treatment; (3) a consolidation apparatus having a thermal consolidation zone, and perhaps a densifying zone, for continuously applying hot-gas to a moving charge, the zone having at least one pair of and perhaps plural paired gas cells wherein a first cell of each pair applies gas to the moving charge and wherein a second cell of each pair operates at a pressure less than in the first cell; and (4) a mechanical densifying apparatus for applying a densifying pressure to the charge downstream of the consolidation zone. The system may further include a mat-forming apparatus downstream of the mixer and upstream of the consolidation zone.

The invention further comprises a method for continuously forming composites. A mixture is formed comprising a waste thermoactive material and a waste filler material. The mixture is then continuously consolidated by applying a hot, dry noncondensable gas to the mixture. The apparatus described above may be used to continuously apply the gas to the mixture, and the mixture may move continuously through a zone where the consolidating gas is applied. Generally, but not necessarily, the filler material comprises cellulosic material, and the thermoactive material is a thermoplastic material. The mixture may further include materials selected from the group consisting of biocides, fungicides, fire retardants, conductive materials, pigments, water retardants, wax-like materials, coupling agents, crosslinking agents, and combinations thereof.

Still another embodiment of the present invention comprises a method for forming a product from cellulosic material and thermoactive material. The method comprises first providing a mixture comprising a predetermined amount of cellulosic material and a predetermined amount of thermoplastic material. A mat is formed from the mixture, and the mat is then consolidated. The consolidated mat is pressed to a predetermined final product thickness. At least a portion of a surface of the mat or product is then surface modified. Consolidating the mixture into a mat can include forming a first face layer of the face mixture, forming a core layer of the core layer mixture on the first face layer, and forming a second face layer of the face layer mixture on the core layer. Forming the core layer may include depositing mixtures of wood flakes and plastic flakes according to mixture flake size in successive layers such that the core layer has larger flakes adjacent the first face layer and adjacent the second face layer, and smaller flakes between the larger flakes in a middle portion of the core layer. The method also can include fusing a sheet comprising a plastic material to least one major planar surface of the mat. The plastic material can then be surface modified, such as by e-beam or flame treating the material. Grafting chemicals can be applied to surface modified mats, plastic material or products.

A method for forming a product having a first face layer and a core layer also is described. The method comprises preforming a first face layer to form a preformed a first face layer. A core layer is deposited on an upper surface of the preformed first face layer.

A method for forming a face layer for a composite product also is described. The method comprises making a face layer mixture comprising predetermined amount of thermoplastic material and cellulosic material. The mixture is deposited on a forming surface, and the mixture is then heated to an activation temperature. The method can also include applying heat energy to the mixture to form a melted face layer.

A composite product also is described. The composite comprises a first portion comprising a first core formed from a mixture comprising a cellulosic material and a thermoplastic material, and at least one face layer attached to at least one major planar surface of the first core. The at least one face layer is formed from a mixture comprising a cellulosic material and a thermoplastic material. The product also comprises a second portion bonded to the first portion. The portion comprises a second core formed from a mixture comprising a cellulosic material and a thermoplastic material, and at least one face layer attached to at least one major planar surface of the second core, the at least one face layer is formed from a mixture comprising a cellulosic material and a thermoplastic material.

BRIEF DESCRIPTION OF THE DRAWINGS

FIG. 1 is a flow chart illustrating certain process steps used to form composites that include filler materials and thermoactive materials in accordance with the invention.

FIG. 2 is a schematic, side elevational view illustrating a cyclone mixer for mixing filler and thermoactive material in accordance with the invention.

FIG. 3 is a schematic, longitudinal sectional view of an embodiment of a continuous consolidation and densifying apparatus in accordance with the invention.

FIG. 4 is a partial schematic longitudinal sectional view showing a portion of a continuous consolidation apparatus in accordance with a second embodiment of the invention.

FIG. 5 is a schematic longitudinal sectional view showing a third embodiment of a continuous consolidation apparatus in accordance with the invention, including a continuous foraminous conveying belt.

FIG. 6 is a schematic longitudinal sectional view showing a fourth embodiment of a continuous consolidation apparatus in accordance with the invention having plural hoods for applying hot gas to a charge and removing the gas after it passes through the charge.

FIG. 13 is a sectional view of the apparatus of FIGS. 7, 8 and 9, except without the extensions rollers and the auxiliary roller, taken along line 13—13 in FIG. 11.

FIG. 14 is an enlarged view of a take-up roll.

FIG. 21 is a schematic side view of a specific implementation of a face forming apparatus.

FIG. 22 is a schematic side view of another specific implementation of a face forming apparatus.

DETAILED DESCRIPTION

Figure 7:
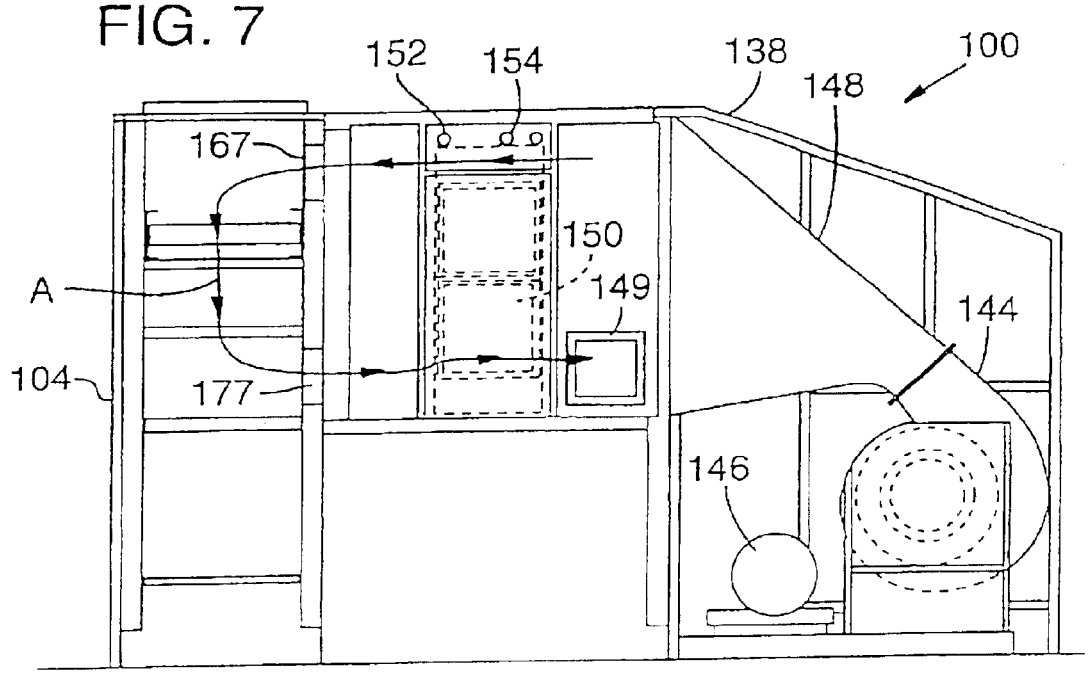
FIGS. 7, 8 and 9 are front, side and plan views, respectively, of a specific embodiment of an alternative consolidation apparatus.

The flow chart of FIG. 1 illustrates certain process steps used to form composite products that include filler materials and thermoactive materials. The first steps in the process require selecting appropriate filler material, selecting appropriate thermoactive material, and thereafter forming a mixture comprising such materials. The mixture may be used as a charge for the continuous consolidation apparatuses illustrated in FIGS. 3–6. Alternatively, the mixture may be processed before being consolidated by the apparatuses of FIGS. 3–6, such as by using a preliminary preheating and/or pressing stages to provide an intermediate substrate. One example of an intermediate substrate suitable as a charge for the illustrated continuous consolidation apparatuses is a mat of the composite material. Mats can be formed using conventional apparatuses known in the art.

The apparatuses illustrated in FIGS. 3–6 continuously consolidate charges in a consolidation stage by applying hot gas thereto using the illustrated hot-gas distribution systems. As used herein, "consolidates" or "consolidation," means that the mixture of filler and thermoactive material is processed from a first initial density to a second, greater density of from about 2.5 to about 60 pounds per cubic foot (pcf), and more typically from about 3 pcf to about 50 pcf, preferably about 25 pcf upon exit from the consolidation apparatus. The second, greater density results, for example, as the thickness dimension of the charge decreases upon application of the hot gas (i.e., thermal consolidation), and perhaps a simultaneous densifying force (mechanical consolidation), thereto. It also should be appreciated that the density of the charge may be serially increased by thermal and/or mechanical consolidation as the charge moves through the consolidation zone.

As indicated by FIG. 1, the consolidated product may then be further compressed to an even greater density in a densifying stage, such as by using a conventional press to a density of about 50 to about 60 pcf, preferably about 50 to about 52 pcf. However, the apparatuses of FIGS. 3–5 may be designed to both compress the charge and consolidate the charge to a greater density than could be achieved by hot gas consolidation alone. And, each pair of cells forming the apparatus may increase the force applied to the charge moving through a consolidation zone. Alternatively, the apparatuses may include (1) a first consolidation stage wherein the density of the charge generally increases by application of the hot gas, and (2) a second densifying stage wherein greater compression forces, and perhaps cooler temperatures than in the heating stage, are applied to the composite product to achieve the product's final desired density, as shown in FIG. 3.

The preferred materials, without limitation, for preparing the composite products comprise waste cellulosic materials and waste thermoactive materials, such as waste plastics. Each of these materials is described below, followed by a discussion of the apparatuses illustrated in the drawings.

I. MATERIALS FOR FORMING COMPOSITES

A. Filler Materials

Without limitation, a partial list of filler materials includes all natural and synthetic fibers, examples of which include cellulosic materials, carbon-based materials such as carbon fibers, glass fibers, and mixtures of these materials. A currently preferred filler material is cellulosic material.

The cellulosic material may be virgin wood materials, i.e., materials that have not been used previously to form products, such as wood chips, sawdust, cotton, hemp, straw, or combinations of such materials. Alternatively, the cellulosic material may comprise waste products, such as used paper, peanut shells, used cotton, used railroad ties, fibers derived from paper mill sludge, fibers derived from recycling mill sludge, and combinations of such materials. Moreover, the cellulosic material may comprise virgin materials mixed with waste materials.

Single-layer products made in accordance with the present invention typically include both cellulosic materials and plastic materials where the average particle size that ranges anywhere from about 3/16 inch in length to about 3/4 inch in length. The strength of the product may be affected by the size of the particles used to form the board product, but cellulosic and plastic materials having particle sizes that range anywhere from about 3/16 inch in length to about 3 inches in length (preferably about 1 ½ inches) have been found suitable for making single-layer products, or the core portion of multilayered board products. Multilayered products made in accordance with the present invention often have one or more layers that include "fines," i.e., materials having an average particle size of less than about 3/16 inch, and more typically having a particle size so that approximately 80% of the particles pass through a 14 mesh size screen.

In a first generation without orientation, the aspect ratio of the flakes ranged from about 2:1 to about 8:1, and preferably from about 2:1 to about 6:1. With orientation, the aspect ratio of the largest flakes is about 16:1 to about 20:1.

B. Thermoactive Materials

The filler material is mixed with a thermoactive material. "Thermoactive" refers to both thermoset and thermoplastic materials. Thermoplastic materials generally are preferred materials because waste thermoplastics can be remelted, allowing the melted thermoplastic material to wick along and to flow around the filler materials. The thermoactive materials act as binders for the filler particles once the thermoactive materials are heated to a temperature sufficient to make them flow, in the case of thermoplastics, or heated to the cure temperature in the case of thermoset materials.

As with the filler material, the thermoactive material may be any material now known or hereafter discovered that is useful for forming composite products. Moreover, the thermoactive material may be virgin, i.e., materials that have not been used previously for any purpose. Alternatively, the thermoactive material can be a waste material, particularly waste thermoplastic materials.

Examples of suitable thermoactive materials include, but are not limited to: polyamides and copolymers thereof; polyolefins and copolymers of polyolefins, with particular polyolefin examples including polyethylene, polypropylene, polybutene, polyvinyl chloride, acrylate derivatives, acetate derivatives, etc; polystyrene and copolymers of polystyrene; polycarbonates; polysulfones; polyesters; polyvinyl chloride; polyvinylidene chloride; copolymers of vinyl chloride and vinylidene chloride; and mixtures of these materials.

This list should not be considered an exhaustive list of thermoactive materials that can be used to form composites. Any readily available, relatively nontoxic thermoactive material which (1) can be made to flow to coat filler fibers or particles, or which can be heated to a curing temperature, and (2) which materials act as suitable binders for the fibrous material, can be used.

C. Additional Materials

The composites that are produced according to the present invention are not limited to having only filler materials and thermoactive materials. A partial list of additional materials that can be used to form such composites includes preservatives, biocides, fungicides, fire retardants, conductive materials such as carbon black, pigments, water retardants, wax-like materials, coupling agents (which are used to enhance the interaction between the filler material and the thermoactive material), crosslinking agents, and combinations thereof.

Crosslinking agents have been found to decrease the creep observed with composite products made in accordance with the present invention. "Crosslinking" refers to reactions that occur with thermoactive materials, either intermolecularly or intramolecularly, most typically intramolecularly, and is distinguished from coupling agents which form bonds between thermoactive materials and the cellulose. See the examples provided below for more detail concerning crosslinking the thermoactive materials and creep. A number of crosslinking agents can be used to practice the method of the present invention. For example and without limitation, suitable crosslinking agents can be selected from the group consisting of organic peroxides, such as dicumyl peroxide, t-butyl peroxide, benzoyl or dibenzoyl peroxide, t-butyl peroxybenzoate, butyl 4,4-di-(t-butylperoxy)valerate, t-butyl cumyl peroxide, di-(2-t-butylperoxyisopropyl) benzene, di-2,4-dichlorobenzoylperoxide, 1,1-di-(t-butylperoxy)-3,3,5-trimethylcyclohexane, 2,5-dimethyl-2,5-di(t-butylperoxy)hexane, 2,5-dimethyl-2,5-di(t-butylperoxy)hexyne, azonitriles, such as 2,2'-azobisisobutyronitrile, azo-type derivatives, such as 2,2-azoisobutene and triazobenzene, and other free-radical generators, such as benzenesulfonyl azide and 1,4-dimethyl-1,4-diphenyltetrazene, and any combination of these crosslinking agents. Particularly suitable crosslinking agents are selected from the group consisting of dicumyl peroxide, t-butyl peroxide, benzoyl or dibenzoyl peroxide, t-butyl peroxybenzoate, and combinations thereof, with dicumyl peroxide being a currently preferred crosslinking agent for use in making cellulose/thermoactive composites according to method of the present invention.

Generally, the crosslinking agents are mixed with the thermoactive component or components prior to forming mixtures comprising the thermoactive component/crosslinking materials and cellulose. This can be accomplished in a batch process by forming a solution, typically an organic solution, comprising a crosslinking agent or agents, and then applying the solution to the thermoactive material. Alternatively, the thermoactive material may be immersed in the solution comprising the crosslinking agent. In a continuous commercial process, the crosslinking agent likely will be applied to the thermoactive material by atomizing liquid crosslinking agent, or a solution comprising the crosslinking agent, and spraying the atomized material onto the thermoactive material.

II. MIXING FILLER AND THERMOACTIVE MATERIALS

Once the desired materials are selected as described above, the materials are then combined to form a mixture. The materials may be mixed by hand or by using a hand actuated mixer. However, for commercial production it is preferred to mix the materials using a large-capacity, continuous or batch blending apparatus that tumbles, oscillates, shakes, or otherwise thoroughly mixes the materials. Such apparatuses are referred to herein as mixers.

The filler material and the thermoactive material may be mixed using a cyclone mixing and/or heating apparatus illustrated in FIG. 2. Cyclone 10 also can be used solely as a heating chamber for preheating a previously formed mixture of filler material and thermoactive material prior to the mixture being consolidated in one of the apparatuses of FIGS. 3–6. Cyclone 10 includes a top 12, walls 14, and a bottom outlet 16. Cyclone 10 also includes a gas supply conduit 18 which passes through wall 14. Gas conduit 18 is coupled to a gas heater 20 and conveys hot, pressurized gas from a gas source (not illustrated) to interior region or chamber 22 adjacent top 12 of cyclone 10. The heater heats the gas to a temperature of from about 250 EF to about 600 EF. Gas conduit 18 is coupled to wall 14 so as to substantially prevent the hot gas from being vented to the atmosphere.

Cyclone 10 also includes at least one additional supply conduit 24 that passes through wall 14 and into the interior region 22. If the cyclone 10 is used solely to preheat the filler material and thermoactive material, then the conduit 24 transports a preformed mixture of these materials to the interior 22 of the cyclone 10. Alternatively, if cyclone 10 is being used as both a mixing and heating chamber, then the cyclone 10 may include a third supply conduit 26. One of the conduits 24 and 26 transports comminuted filler material from a filler material storage unit (not illustrated) to interior region 22. The other of the conduits 24 or 26 transports comminuted thermoactive material from a thermoactive material storage unit (also not illustrated) to interior region 22.

The cyclone 10 is capable of performing several functions, including forming mixtures, heating premixes of suitable mixtures, and simultaneously heating and forming mixtures. The mixing and/or heating functions occur in interior chamber 22. Filler material and thermoactive material naturally descend in a cyclonic flow path 23 towards, and eventually through, outlet 16 and onto a conveyor 28. Conveyor 28 conveys the filler-thermoactive material composition to the consolidation apparatuses illustrated in FIGS. 3–6.

From the foregoing, it will be apparent that cyclone 10, when continuously supplied with filler and thermoactive materials, either separately or in a premix, provides a continuous mixer, and perhaps heater, for the materials. As a result, a mixture or hot mixture may be supplied in a continuous stream, or charge, to the conveyor 28.

FIG. 2 also shows that cyclone 10 may include a hot gas exhaust and recycling conduit 30. This conduit is used to recycle gas from the interior region 22 back to gas heater 20. Alternatively, recycling conduit 30 may be used to supply hot gas to the hot gas distribution systems illustrated in FIGS. 3–6.

Plural cyclones similar to cyclone 10 also may be used. For example, two or more cyclones 10 can be arranged adjacent each other to deliver mixtures onto a conveyor to positions adjacent each other across the width of a conveyor. This arrangement of plural cyclones 10 can be used to form mats and other charges.

Once formed and deposited on conveyor 28, the mixture should be sufficiently permeable to a hot, dry noncondensable gas (discussed in more detail below) so as to allow the hot gas to circulate throughout the composite. The gas circulation can be affected by the ratio of the filler material to the thermoactive material. This ratio is best determined by reference to the attributes desired in the final product. In general, mixtures comprising a 9:1 ratio, by weight, of filler-to-thermoactive materials to 9:1 ratio, by weight, of filler-to-thermoactive materials can be used. Working embodiments of the invention have made mixtures comprising roughly a 1:1 ratio, by weight, of filler particles and thermoactive materials, and currently it is believed that the best results are obtained when the filler materials comprise about 60 weight percent or less of the mixture. Dispensing materials by volume would also be possible, particularly if the bulk density of the materials can be adequately controlled.

The filler particles and plastic particles may be of different sizes and shapes; however, it has been found that the best results, in terms of obtaining a thoroughly mixed material, are obtained when the filler particles or fibers and the plastic particles or fibers are of roughly the same size and shape. Moreover, the larger the particle size, the more time it takes to melt solid thermoactive materials, and the less thoroughly covered are the filler materials by the thermoactive materials. Thus, powdered filler material and thermoactive materials may be used. The particles also generally are mixed at ambient temperatures and under relatively dry conditions, i.e., no added water is used during the formation of the mixture. Additional materials, as discussed above, may be mixed with the filler and thermoactive materials in the mixer.

III. CONTINUOUS CONSOLIDATION

A. Background

One primary advantage of the present invention is that it allows for the continuous, thermal consolidation, and if desired, mechanical densification, of mixtures continuously supplied as described above.

Steam can be used to form the composites by thermal consolidation. However, dry, noncondensable gases, particularly air, are best used for the hot-gas consolidation process. "Dry" refers to a gas in which water is not a major component, although "dry" does include materials that have some water or water vapor. For example, air generally includes some water, the amount depending upon the location. "Dry" does not include gases wherein a major fraction is water, and preferably does not include materials wherein the amount of water exceeds the saturation point of the gas at room temperature.

"Noncondensable" refers to materials that remain in a gaseous state at ambient conditions. One benefit of using a noncondensable gas is that the pressure and temperature of the gas can be independently controlled. This generally is not true for condensable gases, such as steam. When steam is used as the medium for applying heat to the composite, relatively high pressures must be used in order to maintain the gas at the desired temperature.

There a number of gases that satisfy the stated criteria for a dry, noncondensable gas. Such gases include, without limitation, air, nitrogen, carbon dioxide, and combinations of these and other gases.

The temperature of the gas also is an important consideration. For thermoactive materials, the temperature generally must be high enough to "activate" the material. With reference to thermoplastic materials, this generally means that the temperature is sufficiently high to allow the thermoplastic material to become more flowable, i.e., less viscous in nature, so that the material can flow over and around the filler materials. For thermoset materials, there generally is no precise temperature at which the material cures. Generally, the cure rate for thermoset materials depends upon the temperature, i.e., there is a direct correlation between temperature and cure rate.

Some guidance can be provided for selecting an appropriate activation temperature for a given thermoplastic or thermoset material. However, it also should be appreciated that the precise activation temperature depends on a number of factors. A partial list of such factors would include the particular materials being used to form the composite, the thickness of the composite, the ability of the materials forming the composite to absorb heat, and the heat capacity or insulating properties associated with the apparatus used to thermally consolidate, and perhaps mechanically densify, the composite while being heated or heated and densified.

Thermoplastic materials generally have an activation temperature in the range of from about 250EF to about 600EF, and more typically from about 400EF to about 600EF. For thermoset materials, curing may begin at temperatures of as low as about 100EF, although higher temperatures also may be used. The cure rate of thermoset materials also may be enhanced, and the curing temperature lowered, by using catalysts.

B. Consolidation System

FIG. 3 illustrates an apparatus 40 for thermally consolidating and, if desired, mechanically densifying, a filler-thermoactive material charge. Gas-permeable conveyor 28 delivers to apparatus 40 continuously a charge 42 comprising a mixture of thermoactive material and filler, as supplied, for example, from cyclone 10. Charge 42 may be a loose mixture of thermoactive material and filler, known in the art as a fluff, or may be in the form of a partially consolidated mat formed in a pre-consolidation step, which is not shown.

Charge 42 is moved into an enclosed consolidation and heating zone 44 by conveyor 28 through inlet 46. Zone 44 substantially reduces or prevents exposure of people adjacent the apparatus to volatile organic compounds (VOCs) by acting as a containment hood to remove fumes, fines and VOCs that may be emitted during the consolidation process. The enclosed consolidation zone also helps minimize heat loss from the hot gas to the surroundings.

Consolidation zone 44 houses a plurality of hot-air distribution cells, one embodiment of which comprises perforated or otherwise gas-permeable rollers 50a–50h arranged in pairs on opposite sides of a charge 42, for applying hot gas to and drawing hot gas at least partially into and perhaps through charge 42. The actual number of rollers 50 used in a particular embodiment is not critical, and is more likely defined by processing times, production rate, nature and size of the filler and thermoactive materials, and characteristics desired in the final product. FIG. 3 illustrates eight rollers 50a–50h arranged in pairs to engage the major opposed surfaces of charge 42. For example, roller 50a is paired with roller 50b.

Apparatus 40 also includes at least one additional paired set of rollers 52a, 52b located in a region exterior to zone 44 in a densifying stage of the apparatus downstream from the described consolidation stage. In the illustrated embodiment, hot-gas distribution rollers 50a–50h consolidate charge 42 from a first density, i.e., the density of charge 42 prior to entering zone 44, to a second density. This is illustrated in FIG. 3 as a decrease in the thickness of charge 42 from a first thickness to a second thickness in zone 44. Rollers 52a, 52b apply positive pressure to the charge 42 to densify the charge from the second density and thickness to a third density and a thickness. The third density and thickness may be those of the final product, or there may be an additional densifying stage (not illustrated) subsequent to the densification stage represented by rollers 52a, 52b.

Apparatus 40 includes a hot gas distribution system for applying hot gas to, and into, charge 42. The flow of gas through the system can be either counter to the direction the charge 42 moves, or it can be in the same direction the mat moves through the apparatus. Currently, the preferred flow of gas through the system is indicated by arrows 54, which show that the hot gas flows in a direction counter to the movement of charge 42 through apparatus 40. Hot pressurized gas from source 56 flows through checkpoint 58 in the direction of arrow 54. Gas checkpoint 58 may include both pressure and temperature sensors to monitor the pressure and temperature of the gas as it flows through checkpoint 58 and into first densifying roller drum 52a.

Each pair of rollers is coupled so that one is a hot gas application roller and the other of the pair is a suction or evacuation (if a vacuum pump is used) roller. In other words, a pressure differential is created across the pair of rollers. The gas application roller applies gas to one major surface of the charge 42 while the evacuated roller helps draw gas through the charge 42 and into the evacuated roller. For example, with the arrow 54 indicating flow direction, roller 52a operates as a hot gas application roller and roller 52b operates as an evacuated roller, thus creating a pressure differential across the charge to help the hot gas penetrate the charge and thus perform its consolidation function.

Each roller 50a–50h and 52a, 52b is substantially identical and includes a stationary central region 60 for receiving hot gas from or directing the gas to charge 42, depending upon the function of the roller as either an application or suction or evacuation roller. As an application roller, hot gas feeds into roller 52a by a hot gas conduit (not illustrated) and into central portion 60. Central portion 60 is fluidly coupled to a hot-gas distribution region 62 which rotates on central portion 60. External surface portion 64 of the roller is perforated, or is otherwise rendered gas permeable, so as to allow hot gas to flow from hot-gas distribution region 62 through surface 64 and into the charge under a pressure greater, but perhaps only slightly greater, than ambient. In the case of a suction or evacuation roller, gas flow is in the opposite direction, and central portion 60 is maintained under a negative pressure through connection to a suction fan or vacuum pump (not shown).

The rotation of the rollers 50a–50h and 52a,52b is synchronized. As a result, hot gas application region 62 of roller 52a allows hot gas to flow to charge 42 and hot gas evacuation region 66 of roller 52b receives gas after it flows through charge 42. In this manner, the application of hot gas to charge 42 through roller 52a is coupled to the gas drawing capability of roller 52b. Alternatively, the rollers may include an internal, stationary baffle (not shown) that allows hot air to be expelled through perforate rollers.

Gas exiting from roller 52b is routed into zone 44 as indicated by the gas flow arrow 54. Prior to entering zone 44, hot gas may flow through sensor 68, which may include a temperature sensor, a pressure sensor, or both a pressure and a temperature sensor. The temperature and pressure of the hot gas can be continuously monitored at sensor 68 prior to the introduction of the hot gas through a second gas checkpoint 70. Gas checkpoint 70 houses a compressor and heater (not illustrated) to (1) increase or decrease the gas flow rate, (2) increase or decrease the gas temperature or (3) increase the temperature and decrease the flow rate, or (4) increase the flow rate and decrease the temperature, or (5) increase or decrease both the temperature and pressure of the gas as it enters rollers 50h. Alternatively, a charge sensor (not shown) can be positioned between pairs of rollers to directly measure the temperature of the charge. The sensor could provide temperature information to pairs of cells so that the temperature, and perhaps flow rate of air through each pair of cells, can be adjusted.

Whereas roller 52b is an evacuated roller in the illustrated embodiment, roller 50h is a gas application roller. Roller 50g, the roller coupled to roller 50h, is an evacuation roller. Thus, the arrangement of rollers 50g and 50h, with respect to the application of hot air to the opposed major surfaces of charge 42, is opposite the combination of rollers 52a and 52b. In this manner, the application of hot air can be "pulsed" or "reversed" relative to a particular point on the moving charge, i.e., hot gas is applied to one major surface of charge 42 at a first position along apparatus 40 and the charge 42 and to the second major surface of charge 42 at a second position along apparatus 40 and the charge 42. This arrangement currently is believed to ensure sufficient hot gas penetration through the cross section of charge 42 to melt or cure the thermoactive material throughout the entire cross section, and to equalize the temperature gradient throughout the cross section of the charge 42.

Air passing through charge 42 and into evacuation roller 50g then feeds through a third gas checkpoint 72 prior to flowing through roller 50e. Again, at gas checkpoint 72, the pressure and temperature of the gas can be monitored to determine whether either of these variables must be adjusted. Gas flowing from checkpoint 72 then enters gas application roller 50e, which is coupled to a evacuated roller 50f. The gas drawn through charge 42 by roller 50f is then fed through a third gas checkpoint 74. Gas flows through the remaining rollers 50a–50d and through a final checkpoint 78 prior to either being (1) vented to the atmosphere, or (2) recycled into an upstream portion of the gas distribution system.

FIG. 3 also illustrates that apparatus 40 may include baffles 80. Baffles 80 generally are arranged adjacent each of the gas rollers 50a–50h and 52a, 52b. Baffles 80 are positioned to help prevent loss of gas as it enters or exits through surface 64 of each of the rollers 50a–50h, and 52a, 52b.

FIG. 4 illustrates an alternative embodiment of a baffle system that may be used instead of or in combination with the rollers 50a–50h and 52a, 52b. The embodiment illustrated in FIG. 4 shows only four rollers being housed in consolidation zone 44. It will be understood that the number of rollers in either of the embodiments of FIGS. 3 and 4 may vary. The purpose of shrouds 82 is the same as that of baffles 80, i.e., to prevent or reduce the amount of gas escaping from the system as the gas is applied to the charge 42. FIG. 4 illustrates that each of the rollers includes a shroud 82 designed to substantially completely encase the roller therein. It also is possible to use a combination of baffles 80 and shrouds 82.

FIG. 5 illustrates still another embodiment of a continuous consolidation apparatus 100. Again, the number of rollers illustrated may vary according to the particular application desired. Furthermore, structures illustrated in FIG. 5 that are similar to those illustrated in FIG. 3 or 4 will be identified by like reference numbers.

A primary feature illustrated in FIG. 5 is the use of continuous foraminous belts 102, 104. Foraminous belt 102 is trained around belt feed rollers 106a–106d. Continuous foraminous belt 104 is trained around belt feed rollers 108a–108d. The foraminous belts 102 and 104 are positioned between charge 42 and the rollers 50a–50h and 52a,52b. Belts 102 and 104 have two primary functions. First, these belts act as conveyors to convey charge 42 through zone 44. Second, belts 102 and 104 eliminate or reduce the introduction of fines from charge 42 into the components of apparatus 100.

FIG. 6 illustrates still another alternative embodiment of a gas distribution system for applying a hot gas to a charge 42 in zone 44. Again, like reference numbers will be used to designate structures in FIG. 6 that are similar to those illustrated in FIGS. 3–5.

A primary feature illustrated in FIG. 6 is the use of an alternative gas distribution system for distributing hot gas to charge 42. With reference to FIGS. 3–5, the hot-gas distribution system comprises a series of coupled rollers for both applying gas to and drawing gas through charge 42. FIG. 6 illustrates paired gas distribution hoods 110a–110h being arranged in paired fashion on opposite sides of charge 42. Hot-gas distribution conduit 112 feeds hot gas through gas checkpoint 70 and into hood 100h. Hood 110h therefore is an application hood. Hood 110g is an evacuated hood for drawing hot gas through charge 42. As with the previous embodiment, hot gas flowing through the charge 42 is then fed through a gas checkpoint 72 and thereafter through conduit 112 into hood 110e. As a result, hood 110e is a gas application hood, whereas coupled hood 110f is an evacuated hood for drawing hot gas through the charge 42.

IV. OPERATION

The operation of the apparatus will now be described with reference to using thermoplastics as the thermoactive material. The filler material and the thermoplastic material are comminuted, shredded or otherwise reduced to sizes suitable for producing composites. A room-temperature or preheated mixture of the filler material and thermoactive material is formed, such as by using cyclone or cyclones 10. The mixture is then deposited onto conveyor belt 28 as a charge, which leads to the consolidation apparatuses.

The exact pressure to which the gas is pressurized before application to charge 42 in zone 44 depends on a number of factors, such as the materials being used, the speed at which the production line operates, the flow rate, the size of the particles used to form the composite, the thickness of the composite, etc. In general, the pressure of the hot gas as applied to the charge 42 ranges from about 1 psi to about 50 psi. Surprisingly, it has been determined that the melting of thermoactive material does not prevent hot air from passing through the mat. As a result, the pressure of the gas generally varies from slightly above atmospheric, such as about 0.01 psig to at least about 10 psig above atmospheric pressure, with about 0.01 to about 2 psig being typical, and about 1 psig or less being preferred.

As hot gas is applied to composite 42, the volume of the composite decreases if the thermoactive material is a thermoplastic. This is because the thermoplastic material melts and apparently wicks along and flows around the filler material. The mixture thereafter appears to collapse under its own weight to occupy less volume than the mixture comprising solid thermoplastic material, which is referred to herein as thermal consolidation. This is particularly true if thermoplastics are used as the thermoactive material because such materials melt upon application of hot gas. The consolidation apparatuses of FIGS. 3–6 may be designed solely to thermally consolidate (as opposed to a densifying) charge 42, and therefore not compress the composite 42 to a final product density, if the cells do not exert a compression force on the charge. Alternatively, the consolidation apparatuses may exert a compression force to the composite 42. The force applied by the final press typically ranges from about 100 psi to about 1,000 psi, with about 500 psi being typical.

Once the charge 42 exits outlet 48, it may be further processed to provide an aesthetically pleasing commercial product. For example, charge 42 may be (1) sanded to provide a smooth surface, (2) embossed with desired patterns, (3) coated with an exterior coating so as to provide a water-impermeable exterior, (4) covered with a paper-based exterior coating as is known in the art of oriented strand board, (5) laminated with veneer facings, (6) painted, or (7) any combination of 1–6.

Certain of the thermoactive/cellulosic composites made in accordance with the present invention have been surface modified in order to be painted or otherwise surface decorated. Methods for modifying certain thermoactive materials are disclosed in AU 9514510 and 9515286, which are incorporated herein by reference. These methods apparently concern modifying polymeric materials, particularly polyethylene, such as by corona discharge and/or flame treatment oxidation. Flame treatment oxidation is a currently preferred method for oxidizing the surface of the composite product. Oxidation alone is generally not sufficient for promoting durable adhesion to conventional oil or water based paints, especially when wet (see Example 5). Typically, grafting chemicals are thereafter attached to the oxidized polymeric material for coupling other materials, such as paint or veneers, to the oxidized thermoactive material.

But, there are other methods for oxidizing the surface of composite products made in accordance with the present invention for coupling grafting chemicals to the product's surface. Currently, the three most likely approaches for modifying the surface of composite products are as follows: (1) flame and/or corona discharge oxidation, as discussed above; (2) photoreactions, particularly ultraviolet irradiation in the presence of azido compounds, including but not limited to perfluorophenyl azides; and (3) E-beam treatment of the composite product, perhaps simultaneously with the application of grafting chemicals. One possible approach will be to both crosslink the thermoactive material of the composite product by E-beam (see Example 7) while simultaneously applying surface grafting chemicals to the surface of the product.

V. OTHER SPECIFIC IMPLEMENTATIONS

Following are descriptions of specific implementations of products, processes and apparatus for forming composite materials, including, e.g., board products. In the description that follows, the thermoactive material is a thermoplastic material ("plastic") and the filler material is a cellulosic material (e.g., wood), although other materials may be used in accordance with the guidelines described above. Except as specifically indicated, the following description of products, processes and apparatus is consistent with the description above.

A. PRODUCTS

Consistent with the examples discussed below, a description of specific implementations of products follows. In particular, various board products are described, but other products are also possible. "Board products," as used herein, refers to materials made for use in construction or repair applications, typically but not necessarily in substitution for any wood piece, e.g., in lumber, sheet stock, siding, posts, panels, decking (i.e., having a higher load-bearing capacity as required by building codes), tongue-and-groove material, finishing layer material, underlayment material, trim and fascia stock, molded products (such as containers, packaging, etc.), etc., for structural, aesthetic and reliability purposes.

Board products formed by the processes and apparatus described below can be configured in any desired dimensions. In a specific implementation, the board product is formed as a board, i.e., a rectilinear solid having two generally parallel major surfaces (sides), two generally parallel minor surfaces (edges) and two ends. Customarily, boards are produced as relatively long members having a width much less than their length and a thickness less than or equal to their width. In other implementations, the board product may be a 4 feet by 8 feet sheet with a specified thickness, i.e., similar in size to typical plywood and other sheet materials.

As one example, the finished board may be 7/16 inch thick. The length and width of the board are variable, but according to one implementation, the board formed has a length of 17 feet and a width of 30 inches. For aesthetic purposes, the board may include a finishing face to cover the core. The face also provides weather resistance.

The thickness of the face can vary dependent on the thickness of the finished board product. The face thickness can be from about 1/48 inch to about 3/4 inch, and typically is in the range of about 1/36 inch to about 1/4 inch. For a specific implementation of a 7/16 inch board, the face may be about 1/24 in thick. The face is preferably sufficiently thick to shade and cover flakes in the core that "telegraph." Also, the face is preferably formed on at least both major surfaces of the board to provide a balanced construction free from stress concentration on only one major surface. The ends and side edges of the board also can be formed with a face, if desired.

The core material and the finishing face material are each predominately a mixture of plastic material and wood material. The ratio by weight of wood to plastic in the core mixture may be from about 10%/90% to about 90%/10%, and preferably from about 45%/55% to about 55%/45%. A desirable ratio is about 50%/50%. The ratio by weight of wood to plastic in the face may be from about 30%/70% to about 0%/100% (i.e., the face may be formed entirely of plastic), and preferably about 30%/70%. The product as formed has a density of about 40 to about 65 pcf, and preferably about 50 to about 52 pcf.

B. PROCESS

Figure 16:
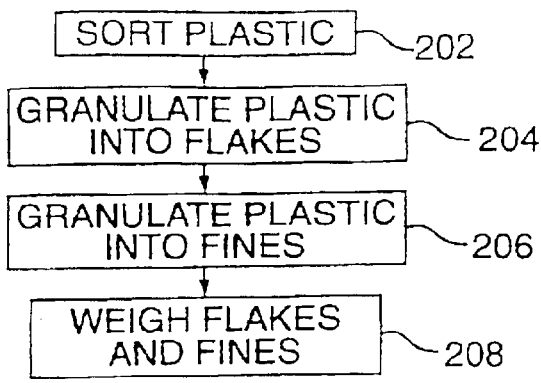
FIG. 16 is a flow chart illustrating process steps used to prepare plastic material for blending.
Figure 17:
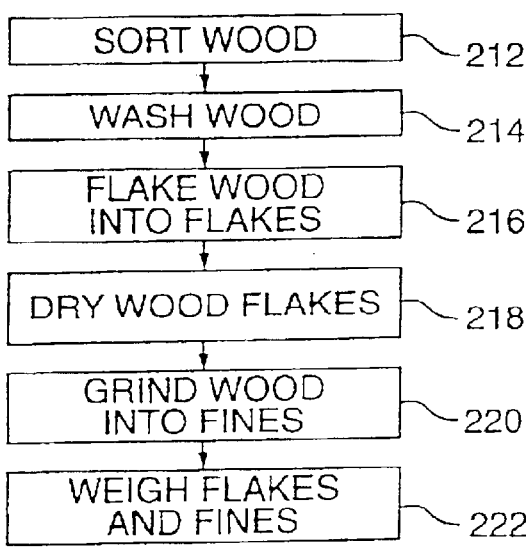
FIG. 17 is a flow chart illustrating process steps used to prepare wood material for blending.
Figure 18:
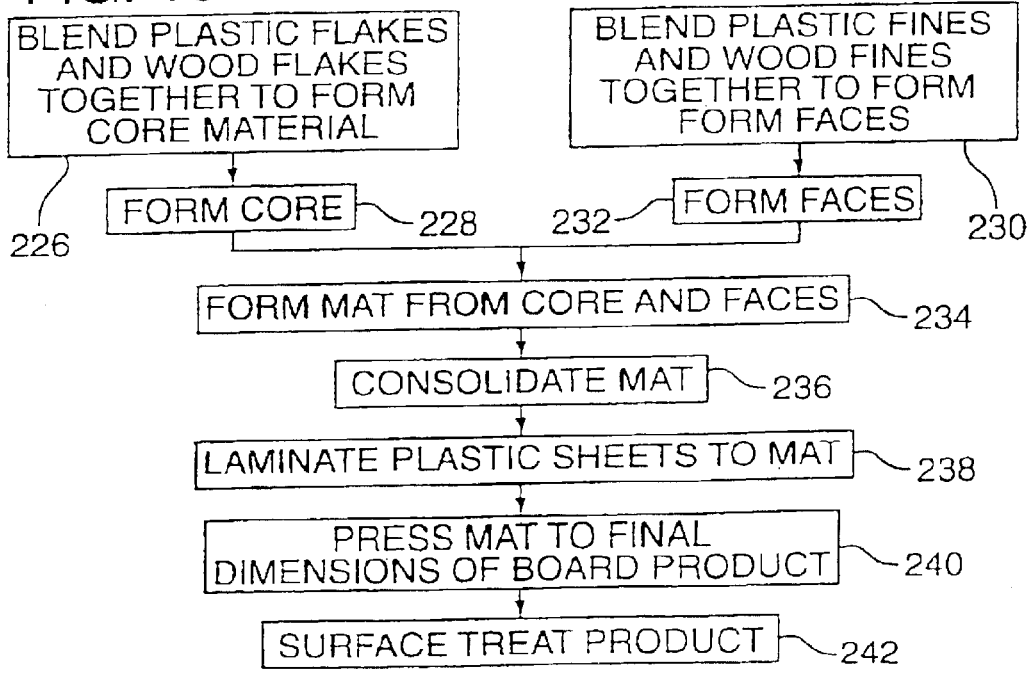
FIG. 18 is a flow chart illustrating process steps for a specific implementation of forming a board product.

Referring to FIGS. 16–18, according to one implementation of the process, the plastic is collected and sorted (step 202). The collection and sorting may take place at a remote site. The sorting may include sorting the plastic by type, e.g., distinguishing high density plastic material and low density plastic material, discarding undesired material, etc. The plastic material to be used may include any fraction of waste or non-virgin plastic.

The sorted plastic is then granulated. According to a specific implementation, the plastic is granulated in a U.S. Granulator 2436 5KN granulator. The plastic was granulated into two sizes to make working embodiments: (1) flakes, for use in the core of the product (step 204); and (2) fines, for use in the faces of the product (step 206). In one implementation, the sorted plastic material is granulated once to obtain the coarse flakes, and a portion of the coarse flakes are granulated a second time to produce the fines. In particular, the plastic may be ground into 1/2 inch flakes by using a 1/2 inch screen plate in the granulator (i.e., a plate with an aperture allowing pieces of up to about 1/2 inch to pass). Some of the 1/2 inch flakes can be granulated into fines with a U.S. Granulator radial granulator having a 1/8 inch screen plate. Other flake sizes could be made, including from 3/16 inch to 3/8 inch. Commercial embodiments will likely use 7/16 inch flakes.

After the plastic is granulated, it is sorted by weight (step 208). The granulated plastic may be conveyed, e.g., to a storage area or a subsequent process step, with forced air. The sorted plastic may be stored for later use or used directly as part of a continuous process.

The raw wood material also is collected and sorted (step 212). The raw wood material may include virgin wood, recovered wood and stumps. In a specific implementation, the raw wood material was reduced in size and then sorted by passing it over a first plate with a 4 inch diameter hole positioned above a second plate with 1 inch diameter hole. The wood pieces that pass through the first plate but not the second plate, i.e., wood pieces between about 3/4 inch and about 7 inches (subject to screen efficiency), are segregated into (1) large wood pieces (typically from about 1 1/2 inches to 7 inches) and (2) small wood pieces (typically from about 3/4 inch to about 4 inches). The wood pieces that pass through both the first and the second plate (i.e., wood pieces smaller than about 1 inch) are screened off and used to form the fines.

Multiple flakers will likely be used. In commercial embodiments, sorting as described herein may not be required.

Optionally, the large and small wood pieces may be washed to remove excess debris (step 214). Grinding moist wood also reduces the amount of dusting that occurs as a result of the process. In a specific implementation, the large wood pieces and the small wood pieces are each soaked for about two hours and then washed in a conventional chip washer. In commercial processes, the wood pieces will be soaked from 30 seconds up to about 2 hours, depending on the cleanliness required.

The large wood pieces and the small wood pieces are flaked to desired sizes. In a specific implementation, the large wood pieces and the small wood pieces were separately flaked to desired sizes (step 216). After flaking, the flakes from the large wood pieces (about 1 1/2 inch to about 7 inches long) have a mean length of about 3 inches, and range from about 1 inch to about 5 inches (typically about 2 inches to about 4 inches). The flakes from the small wood pieces (about 3/4 inch to about 4 inches) have a mean length of about 1 1/4 inches, and range from about 3/8 inch to about 3 inches (typically about 3/4 inch to about 1 1/2 inches).

If necessary, the flakes may be dried to a desired moisture content according to any suitable known method (step 218). If the moisture content is higher than about 5%, the throughput of subsequent processing is lessened due to the required drying time. In one specific implementation, the flakes from the large pieces were dried separately from the flakes from the smaller pieces.

The flakes can be dried using a conventional gas conveyor dryer. One suitable dryer is the Proctor Schwartz gas conveyer dryer, although other suitable dryers and drying methodologies would be known to those of ordinary skill in the art. Preferably, the flakes can be dried to a moisture content of about 2%.

The flakes can be further screened to segregate pieces larger than and smaller than a desired size or sizes. Such oversized and undersized material can be collected and ground to form the wood fines (step 220).

In one specific implementation, the flakes from the large wood pieces were screened with a 1 ¼ inch diameter punch plate and a ³⁄₁₆ inch diameter punch plate. Separately, the flakes from the small wood pieces were screened with only the ³⁄₁₆ inch punch plate. After screening, the "accepts," i.e., the remaining large and small flakes, occur in the core mixture in ratios from about 20% large flakes/80% small flakes to about 60% large flakes/40% small flakes.

The smaller material that passes through the ³⁄₁₆ inch diameter plate can be double refined to form the wood fines using a conventional refiner. One suitable refiner is a Bauer single or double disk refiner (24 inch diameter). The resulting refined material was screened through a U.S. No. 20 mesh screen and a U.S. No. 30 screen fin series). Accepts represent 80% of the original material. The material that passes through both screens is discarded as waste.

By segregating the wood into large pieces and small pieces, and flaking the large pieces separately from the small pieces, a greater portion of longer flakes is preserved than if the large pieces and the small pieces are ground together.

The ground wood flakes and fines are sorted by weight (step 222). The ground wood flakes and fines may be stored for later use or used directly as part of a continuous process.

The moisture content of the plastic material, the wood material and/or both materials in combination may be periodically monitored throughout the process as necessary, as is known to those of ordinary skill in the art.

To form the core, the plastic material (i.e., the plastic flakes) and the wood flakes are blended together in a suitable core mixture (steps 226, 228), as discussed above. In a specific implementation, the plastic material and the wood material were blended together in a conventional rotary drum blender. Any other suitable type of blending that does not break or split the fibers in the wood also may be used.

To form the faces, the plastic fines and the wood fines were blended together in a face mixture (steps 230, 232). In a specific implementation, the plastic fines and the wood fines are blended together using a conventional twin screw ribbon blender. The ratio by weight of wood to plastic in the face mixture may be from about 70%/30% to about 0%/100%, and preferably about 50%/50% to about 30%/70%. Because the fines used to form the faces are relatively small, they may be lost before being processed into the completed faces. For example, fines may be lost at gaps in a moving belt as part of a continuous process or at transitions between processing steps.

According to one implementation, the faces are pre-consolidated (i.e., consolidated before the subsequent consolidation of the board product having both the faces and the core). In a preferred embodiment, an amount of the face material that has been deposited on a lower surface having a stick-resistant coating (e.g., PTFE) is heated to the activation temperature of the face material while being subjected to pressure from an upper stick-free surface. As described in more detail below, the lower and upper stick-free surfaces may be moving belts coated with-PTFE such that the faces can be formed in a continuous process. In another implementation, the face material is heated to its activation temperature while it travels through a long-tunnel. In another implementation, infrared (IR) radiation, e.g., from lamps, is used to heat the face material to the activation temperature. In the heated tunnel and IR radiation implementations, the face is mechanically consolidated downstream of the heating area, e.g., by using a roller at a temperature below the temperature of the face material.

The upper melting point of polyethylene is about 254° F. Thermal degradation of wood begins at about 360° F. Because the pre-consolidation process is time-temperature dependent, different temperatures and dwell times can be used. For example, if higher temperatures are used, dwell times at the higher temperatures can be decreased to lessen cellulose degradation.

The pre-consolidated faces can be stored for future use (i.e., by rolling) or can be used continuously in a consolidation step for forming the board product from the faces and a core.

Figure 19:
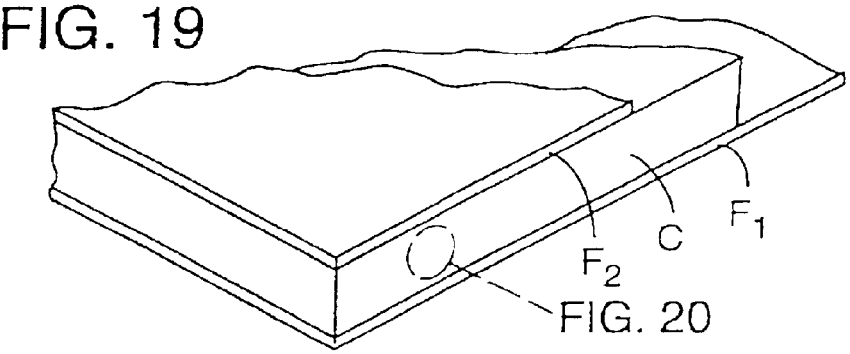
FIG. 19 is a partial perspective view of a board product with a core and two faces.

According to one implementation, a first face is formed, the core is formed on an upper major surface of the first face, and then a second face is placed over the upper major surface of the core. FIG. 19 is a partial perspective view of the three-layer construction, showing a first face $F_1$, a core C and a second face $F_2$. Either or both of the face forming operation and core consolidation operation (described below), or a combination thereof, may be configured as a continuous process.

Either or both of the first face and the second face may be formed previously. For example, the second face may be formed previously, and added to the upper surface of the core at an appropriate time. Alternatively, the first face may be formed previously, and the second face may be formed in parallel with the core and then added to the core. It also is possible to form the core separately from the faces, and then subsequently add the faces.

Preforming at least one of the faces, i.e., before the core material is deposited on that face, has several benefits. By forming the faces on a solid belt, thin, uniform faces can be formed with consistency. The belt provides a flat, regular reference surface, and the face formed on the belt is thus flat, regular and suitable as a reference surface for the core. With a preformed face as a bottom surface of the mat, the mat can be easily transferred from one conveyor to another (e.g., across gaps) without excess dusting and/or loss of material. With a preformed face, the wood and plastic fines are entrapped and not subject to being blown away, e.g., in the consolidation apparatus to be described below. Decreased dusting results in a lower fire risk. Further, the premelted face prevents the mat from sticking to the conveyor and other surfaces within the consolidation apparatus.

According to the implementation described above, the board product before consolidation was formed as a mat by depositing the core mixture in a predetermined fashion on the first face as the first face moves on a moving belt (step 234). In particular, the wood flakes are aligned and graduated. In one specific implementation, the wood flakes were aligned, graduated and deposited with the plastic flakes, which were also graduated and deposited, using two Acro-wood disk screeners arranged in series and opposed in the movement direction.

Figure 20:
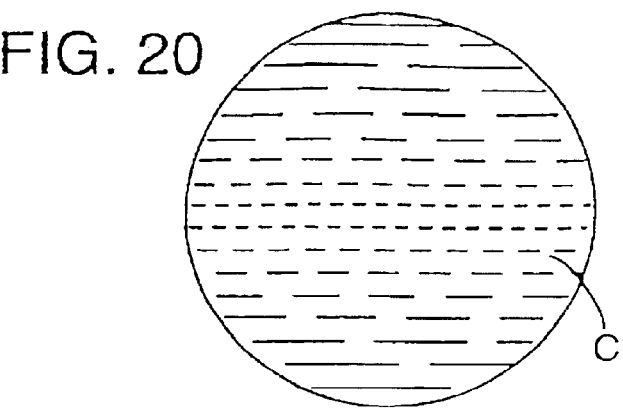
FIG. 20 is a magnified cross-sectional view of the core showing the size distribution and orientation of the flakes.

In particular, the screeners were used to deposit the core mixture such that the bottommost flakes were largest, progressively decreasing in size to about the middle of the core, and then progressively increasing in size from the middle of the core to its upper surface, with the uppermost flakes being about the same size as the bottommost flakes, as shown in FIG. 20.

After the core material is deposited, the second face is placed onto the upper surface of the core to complete the mat.

The mat formed of the first face, the core and the second face is subjected to consolidation, generally by applying both heat and pressure (step 236), although not necessarily simultaneously. The mat for a 7/16 inch thick board product is about 7 ½ inches thick before consolidation. According to one implementation, the mat is moved through a consolidation apparatus on a moving belt while being subjected to heat and pressure. The application of heat and pressure is regulated to control the properties of the product, including degradation of the cellulose, loss of material (e.g., through the sides), etc.

One implementation of the consolidation apparatus uses hot air to raise the plastic material of the mat to its activation temperature. In this implementation, the moving belt is perforated such that the hot air can be circulated through the moving belt and mat as they travel through the consolidation apparatus. The air temperature within the consolidation apparatus may be from about 100° F. to about 600° F., and preferably is about 250° F. to about 450° F. In one working implementation, the air temperature was about 400° F. The air can be circulated at any pressure from 0.2 to 1.2 psi, and typically from about 0.2 to 0.6 psi (preferably 0.4 psi). After the mat is consolidated, it can be cooled to facilitate its release from the moving belt. Cooling the mat causes it to shrink slightly.

The consolidated mat can then be laminated (step 238). It also is possible to laminate the mat prior to consolidation. Laminating a thin layer of plastic to one or both major surfaces of the consolidated mat provides a consistent quality surface that will more readily receive a surface treatment as described below than a non-laminated surface. Laminating a surface as described also ensures complete plastic coverage of that surface and provides a water resistant surface. The laminate is applied on the major surfaces and then subjected to heat (about 250° F.) and pressure to cause it to couple or fuse to the faces, thereby ensuring a non-discrete laminate. Laminating both major surfaces ensures a balanced construction, which helps prevent warping.

In a specific implementation, the laminate was a 2 millimeters thick sheet of polyethylene. Preferably, the polyethylene has known, consistent properties. If polyethylene is used as the laminate material, it flows and bonds with the polyethylene material in the faces without resulting in any discernible interface. Other polymeric materials (such as polyolefins) also may be used as a laminate.

Following lamination, the composite is pressed to the final thickness of the board product using a conventional pressing apparatus (step 240). A suitable pressing apparatus is an IECO C-frame press. In specific implementations, the board product also was embossed with a pattern (e.g., woodgrain) and/or cooled as it was pressed.

The pressing action applied on the major surfaces of the board product to form it to its final dimensions requires only about 100–400 psi, and more typically 200–300 psi, depending upon pressing rate, product thickness and density requirements. In a specific implementation, the applied pressure in the pressing action is about 250 psi. The upper limits of the pressure applied during the pressing action are determined to avoid loss of material through the side edges of the board product. Under certain conditions, it may be desirable to first cool the edges before and/or during pressing of the major surfaces. Such cooling will cause the edges to harden and prevent material loss through the edges. The press can be stationary, in which each board product is inserted individually, or moving, in which case the board products travel through the press in a continuous process.

Following pressing, the board product can be cut or trimmed to final dimensions using conventional equipment and methods. Thereafter, the board product is subjected to surface treatment (step 242). Alternatively, the product may be surface treated before being trimmed to size.

In a specific implementation, the board product was surface oxidized by flame treatment, and a grafting chemical was applied. After drying using conventional drying technology, which allows solvent to escape, the board product was ready for painting using known apparatus and methods.

C. APPARATUS

FIG. 21 shows a specific implementation of a face forming apparatus 300. The face forming apparatus has a housing 302, an entrance end 304 and a delivery end 306. The housing 302 preferably is insulated to minimize heat loss.

An upper moving belt 308 and a lower moving belt 310, which are driven at the same speed by a belt driving unit (not shown), are rotatably supported by upper moving belt rollers 312 and by lower moving belt rollers 314, respectively. A portion of the upper moving belt 308 is heated as it circulates through the housing 302 by contact with an upper platen 316. Similarly, a portion of the lower moving belt 310 is heated as it circulates through the housing 302 by contact with a lower platen 318.

The lower moving belt 310 extends beyond the entrance end 304 to provide a surface upon which to receive a desired face material mixture for forming the faces. As illustrated, a forming head 315 dispenses the face material onto the lower moving belt 310 as the lower moving belt approaches the entrance end 304.

The distance separating the upper moving belt roller 312 from the lower moving belt roller 314 at the entrance end 304 may be greater or less than a starting thickness 320 of the face being formed. The distance separating the upper moving belt roller 312 from the lower moving belt roll 314 at the delivery end 306 is equivalent to a formed thickness of the face. Thus, the upper moving belt 308 slopes slightly downward with respect to the lower moving belt 310, which is generally horizontal, in the direction from the entrance end 304 to the delivery end 306. In a specific implementation where the face mat was 3/8 inch thick, the starting thickness 320 was about two and one-half times greater than the formed thickness 322.

The upper moving belt 308 and the lower moving belt 310 are preferably solid to minimize loss of face material through the surface of the belts, particularly the lower moving belt 310. Each of the upper moving belt 308 and lower moving belt 310 was formed of a synthetic conductive material. In a specific implementation, the belts were coated with a stick resistant material to facilitate release of the formed face from the belts. An example of a suitable stick resistant material is polytetrafluoroethylene (PTFE). Other similar materials also could be used.

As stated, each of the upper moving belt 308 and the lower moving belt 310 is heated by conduction through contact with the heated upper platen 316 and the heated lower platen 318, respectively. In a specific implementation, the belts were heated to a temperature of about 300° F. to about 600° F., and preferably, to between about 400° F. and 500° F., which is above the activation temperature point of the plastic material.

The length of the face-forming apparatus 300, belt operating temperatures and belt speeds may be varied according to desired processing requirements, including, e.g., face thickness, power requirements and throughputs. In a specific implementation for making a 1/20 inch face, the time required to form one face using 450° F. upper and lower platens was about 15 seconds to about 1 minute, and preferably less than 30 seconds.

If necessary, the face forming apparatus 300 can include an optional cooling station 324. In a specific implementation, the cooling station 324 included an upper cooling roll 326 and a lower cooling roll 328 (or corresponding cooling platens). As illustrated, the upper moving belt 308 was extended to circulate around the upper cooling roll 326, and the lower moving belt 310 was extended to circulate around the lower cooling belt 328. The cooling rolls 326, 328 are at a lower temperature than the portions of the respective belts 308, 310 exiting the delivery end 306. Thus, these portions of the belts 308, 310 are cooled by contact with the respective cooling rolls 326, 328.

In turn, the formed face is cooled through contact with the cooled belt portions, and the cooled face shrinks slightly, thus facilitating its release from the belts 308, 310.

As illustrated, the upper cooling roll 326 and the lower cooling roll 328 are separated from each other by a distance about equal to the formed thickness 322 of the face. The upper cooling roll 326 and the lower cooling roll 328 are maintained at a temperature, e.g., by cooling with a circulating fluid, below the melting temperature of the plastic material, e.g., at about ambient temperature. Cooler temperatures promote result in faster cooling. Other suitable cooling methods also can be used.

Other face forming methodologies also may be used. For example, the faces may be formed using IR radiation. In a specific implementation, the face material was deposited on a solid surface, and then subjected to IR radiation from above to melt the plastic in the face material. One specific implementation of a face forming apparatus 400 is illustrated in FIG. 22.

As illustrated, face material is dispensed from a forming head 402 onto a moving belt 404 to provide the initial form of a face F. The moving belt is rotatably supported on moving belt rolls 406. The moving belt 404 is circulated beneath one or more IR units 414 that are positioned to direct IR energy onto an upper surface of the face as the face moves through the housing 310 on the moving belt 404 over a surface 415. The IR units heat the plastic material in the face, preferably to at least its activation temperature. After the face is heated, the face passes beneath a press roll 416 that presses the face against a flat surface, such as a surface 417.

Depending upon the intensity of the IR radiation and the desired thickness of the face, the surface of the face that travels on the moving belt 404 must also be subjected to direct IR treatment. In one specific implementation, the face is turned over by a face turning apparatus 418. The untreated surface of the face is then fed on the moving belt 404 and subjected to IR treatment.

In the illustrated embodiment, the face turning apparatus 418 has a moving belt 419 rotatably supported by rollers 423. The path of the moving belt 419 is configured to bend around a turning roller 421. As illustrated, a face F that has been surface treated on one major surface (shown in dashed lines) travels on the moving belt 419, enters the nip formed by the moving belt 419 and the turning roller 421, follows the circumference of the turning roller 421 in the counterclockwise direction and is turned over near the 1 o'clock position of the turning roller 421. The face is then released from between the turning roller 421 and the moving belt 419, and allowed to slide down a guide plate 425.

The illustrated face forming apparatus 400 is configured to operate in a forward direction 420. Alternatively, the face forming apparatus may be configured to operate in a reverse direction 422 (e.g., in a second pass to process the second of two surfaces), as well as the forward direction 420.

In yet another implementation of the face forming apparatus, a long, insulated housing 429 (shown in dashed lines), is provided in place of the IR units 414. The face is heated as it travels the length of the housing, and reaches the activation temperature near the end of the housing.

Figure 27:
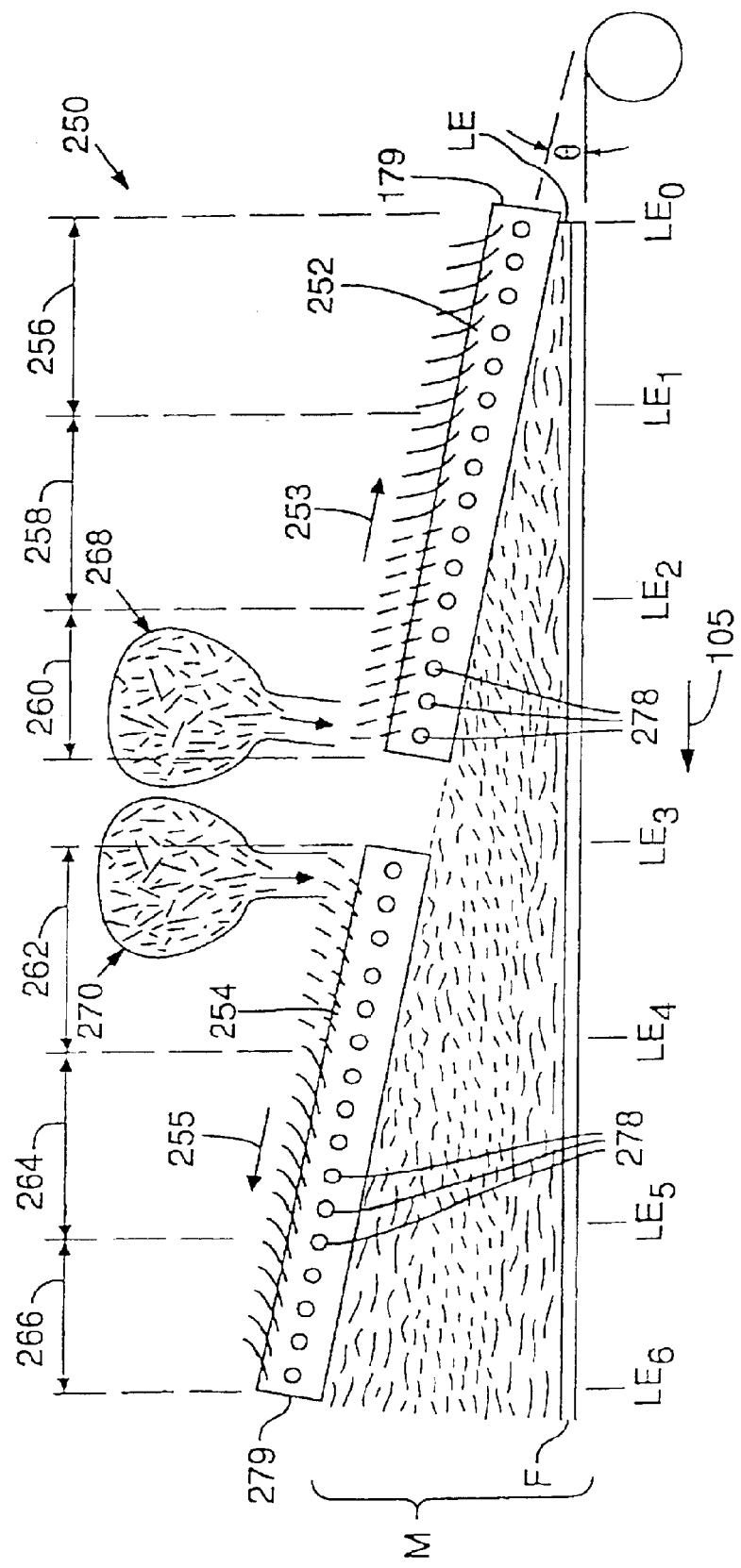
FIG. 27 is a schematic side view of a screening apparatus.
Figure 28:
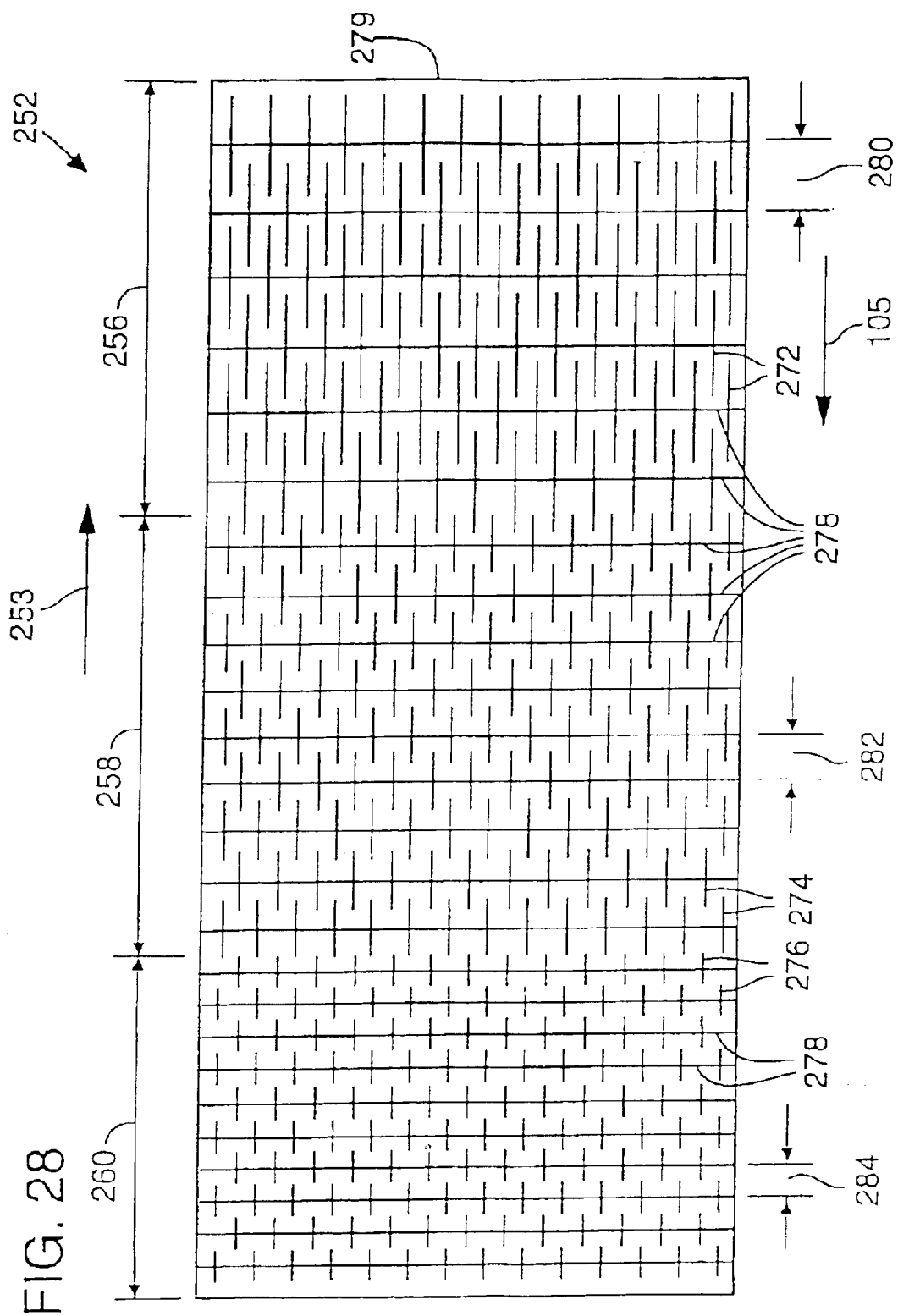
FIG. 28 is a schematic top view of a first stage of the screening apparatus of FIG. 26.

FIGS. 27 and 28 show a specific implementation of a screening apparatus 250. As shown in FIG. 27, the screening apparatus 250 is arranged above a face F of a mat M being developed through deposition of core material. The screening apparatus 250 has a first stage 252 and a second stage 254, which are arranged in series in the process direction 105 of the moving mat M. The first stage 252 and the second stage 254 are positioned as shown to be inclined upwardly from horizontal relative to the process direction 105 at an angle θ. In a specific implementation, the angle theta is about 10°.

The first stage 252 has multiple sorting zones, including, e.g., zones 256, 258 and 260 as illustrated. Similarly, the second stage 254 has multiple sorting zones, including, e.g., the zones 262, 264 and 266 as illustrated. Each of the multiple sorting zones is sized to allow a different flake size to pass through and be deposited upon the mat M. As illustrated, the first stage 252 and the second stage 254 are opposed to each other, and the sizes of the zones 262, 264 and 266 in the second stage are the same as the sizes of the zones 260, 258 and 256 of the first zone 252, respectively.

Referring to FIG. 28, which shows the configuration of the first stage 252 (the second stage 254 being similar, but reversed), each of the zones 256, 258 and 260 includes a plurality of sprockets 272, 274 and 276, respectively, that are rotatably supported on axles 278 extending through a generally rectangular frame 279. The axles 278 are drivingly coupled together. The sprockets on adjacent axles 278 are interspersed with each other. Within the zone 256, the axles 278 are spaced by an interradial distance 280 (i.e., in the process direction 105), e.g., 1/4 inch.

Within the zone 258, the axles 278 are spaced by an interradial distance 282, e.g., 1/8 inch. Within the zone 260, the axles 278 are spaced by an interradial distance 284, e.g., 1/16 inch. Because the zones 262, 264 and 266 of the second stage 254 have the same sizes as the zones 260, 258 and 256 for the illustrated first stage 252, respectively, the interradial distances for the zones 262, 264 and 266 are the same as the interradial distances 284, 282 and 280, respectively.

In continuous operation after initialization, core material is dispensed from a first stage dispenser or chute 268 onto the first stage 252, and from a second stage dispenser or chute 270 onto the second stage 254, while the mat M is moving in the process direction 105. The first stage 252 is driven in a first stage direction 253 from left to right in FIG. 27 by a conventional chain drive mechanism (not shown). Thus, the dispensed core material is progressively graduated and aligned as it travels from the zone 260 through the zone 258 to the zone 256. In particular, the sprockets 276, 274 and 272 in the respective zones contact the flakes and tend to align them lengthwise in the first stage direction 253 as the flakes are moved by the action of the sprockets through one or more of the zones 260, 258 and 262.

At the same time, flakes in the core material dispensed onto the first stage 252 begin passing through the first stage 252, and being deposited on the face F according to their size. The smallest flakes tend to be deposited first, i.e., through the zone 260. Slightly larger flakes, which may have been aligned in the zone 260, begin passing through the first stage 252 in the zone 258. Finally, the largest flakes, which may have been aligned in the zones 260 and 258, begin passing through the first stage 252 in the zone 256. Some flakes pass through the first stage 252 directly, whereas others pass through to a limited extent until they contact the upper surface of the developing mat M and are pulled slightly by the movement of the mat M in the process direction.

FIG. 27 shows the development of the mat M during a continuous phase after an initialization period has elapsed. In particular, FIG. 27 shows the development of one point on the mat, a leading edge LE, from the beginning of the continuous phase (at $LE_0$) as the mat M moves from right to left in the process direction 105. During this initialization period, which is not illustrated, the dispenser 268 begins operating, and the first flakes that pass through the first stage 252 and contact the face F are the smallest flakes, i.e., the flakes that can pass through the zone 260. Similarly, slightly larger flakes begin passing through the zone 258. As described above, however, the desired graduation of the core material begins with the largest flakes being deposited as the bottommost layer onto the face F. Therefore, after the first stage 252 begins operating, the initialization period continues until a point on the face F begins receiving the largest flakes first. This point becomes the leading edge LE of the mat M, and is designated $LE_0$. The material deposited during initialization ahead of the leading edge LE is recycled for later use during the continuous phase.

During continuous operation, as the leading edge LE moves forward in the process direction 105 below the zone 258, slightly smaller flakes are deposited on the largest flakes (beginning at $LE_1$). Similarly, still smaller flakes are deposited on the slightly smaller flakes as the leading edge moves forward below the zone 260 (beginning at $LE_2$).

Still during continuous operation, the progressive development of the mat M continues as the leading edge LE moves forward beyond the first stage 252 to below the zone 262 of the second stage 254. From the zone 262, flakes approximately the same in size as those deposited from the zone 260 continue to be deposited (beginning at $LE_3$). As the leading edge LE moves forward below the zone 264, larger flakes are deposited on the smaller flakes (beginning at $LE_4$). Finally, as the leading edge LE moves forward below the zone 266, the largest flakes are deposited (beginning at $LE_5$), thereby forming the uppermost layer and completing the core (at $LE_6$).

The second stage 254 is driven similar to the first stage 252 by a conventional chain drive (not shown), but in a second stage direction 255 opposite the first stage direction 253.

Figure 8:
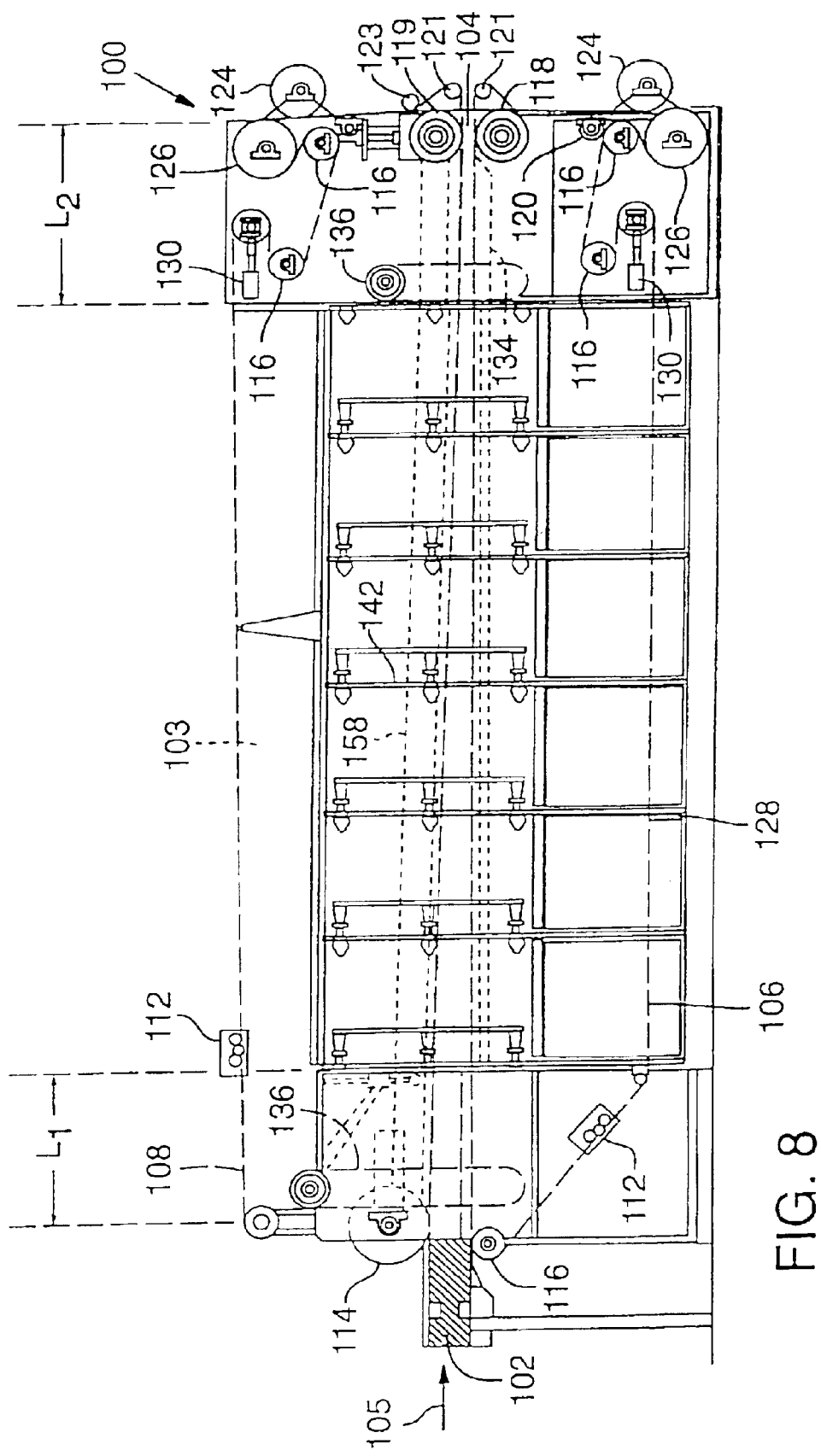
Figure 9:
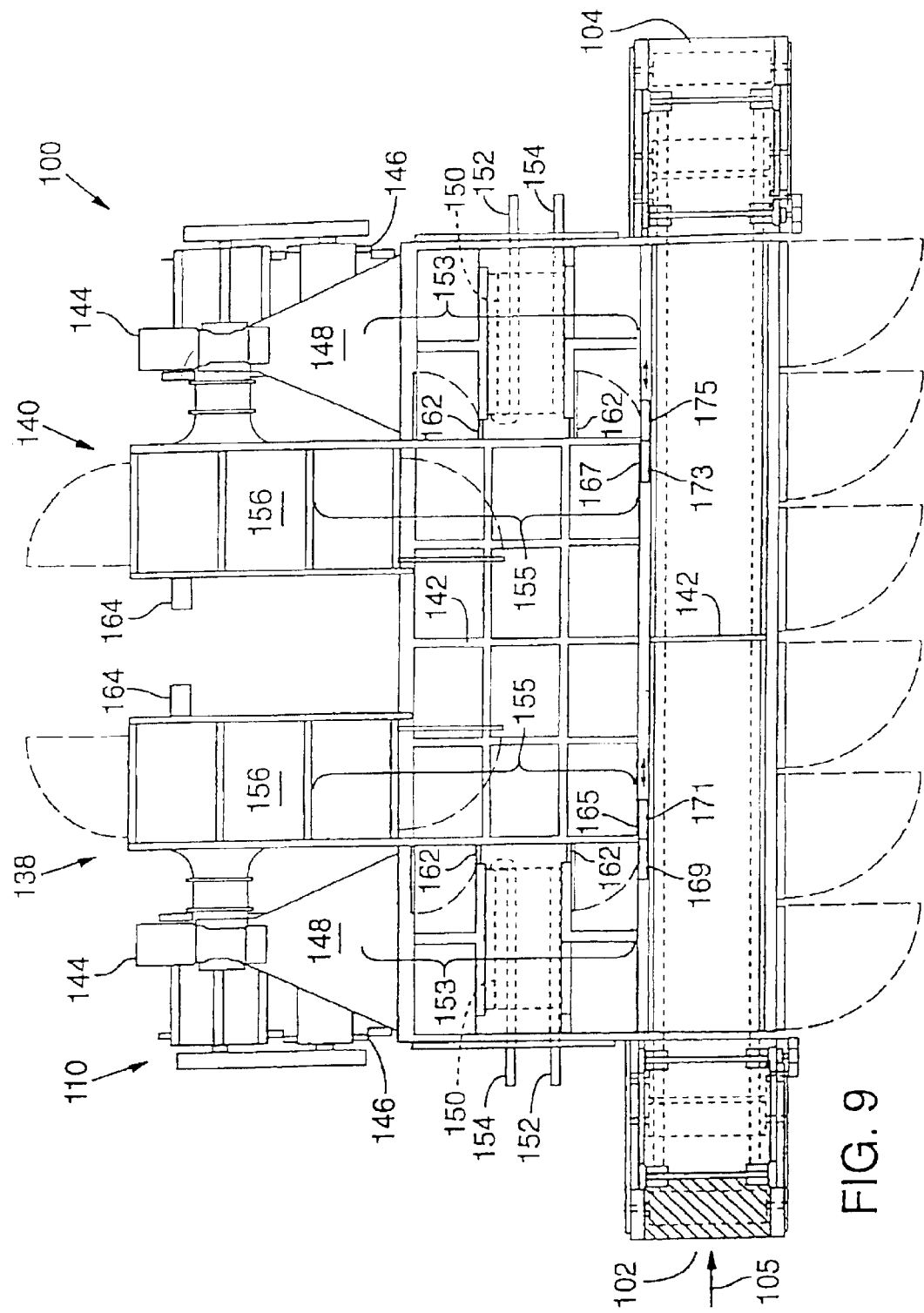
Figure 10:
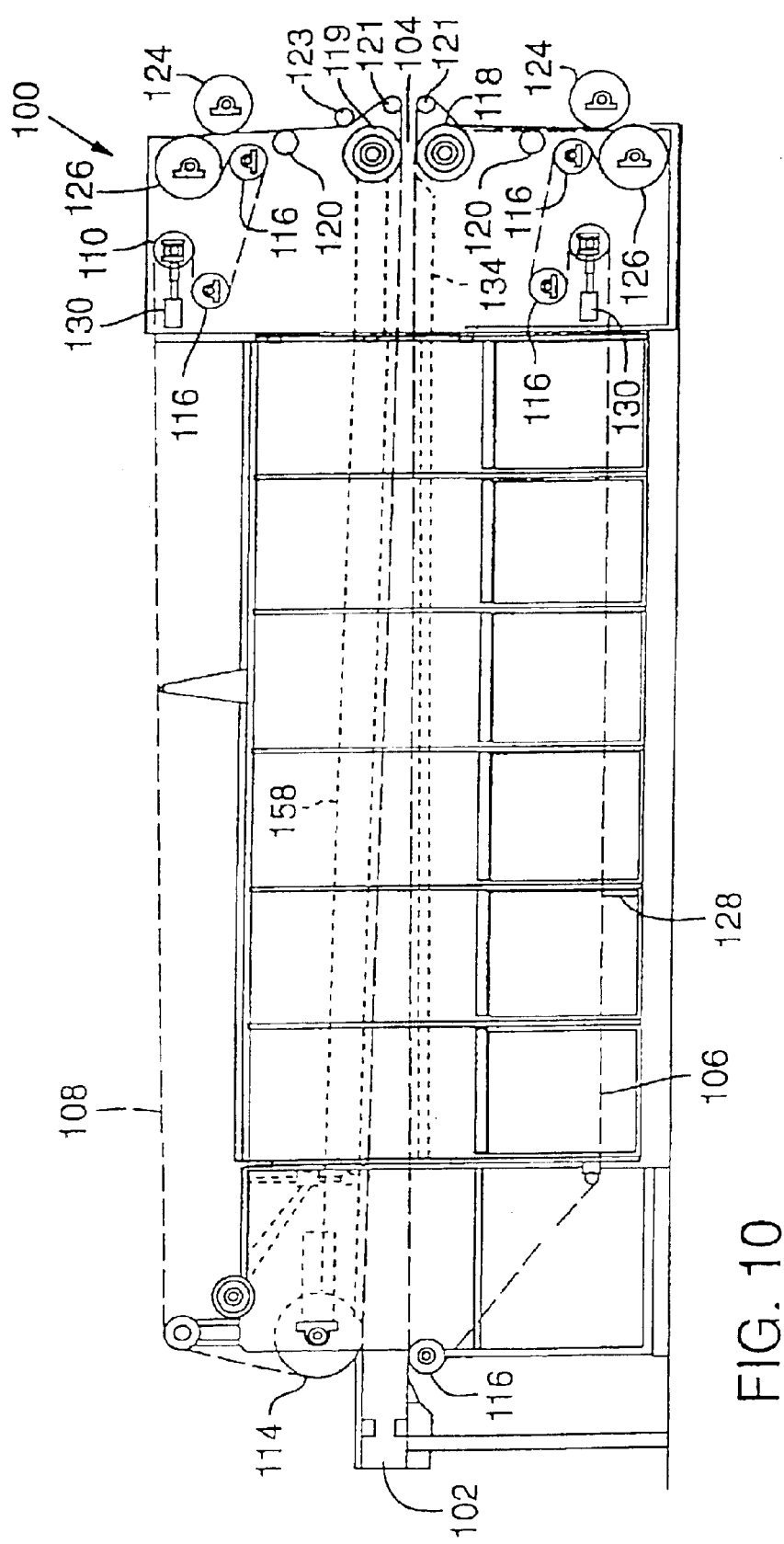
FIG. 10 is a slightly enlarged side view of the apparatus of FIG. 8 with some detail removed to shown the path of the conveyers through the apparatus.
Figure 11:
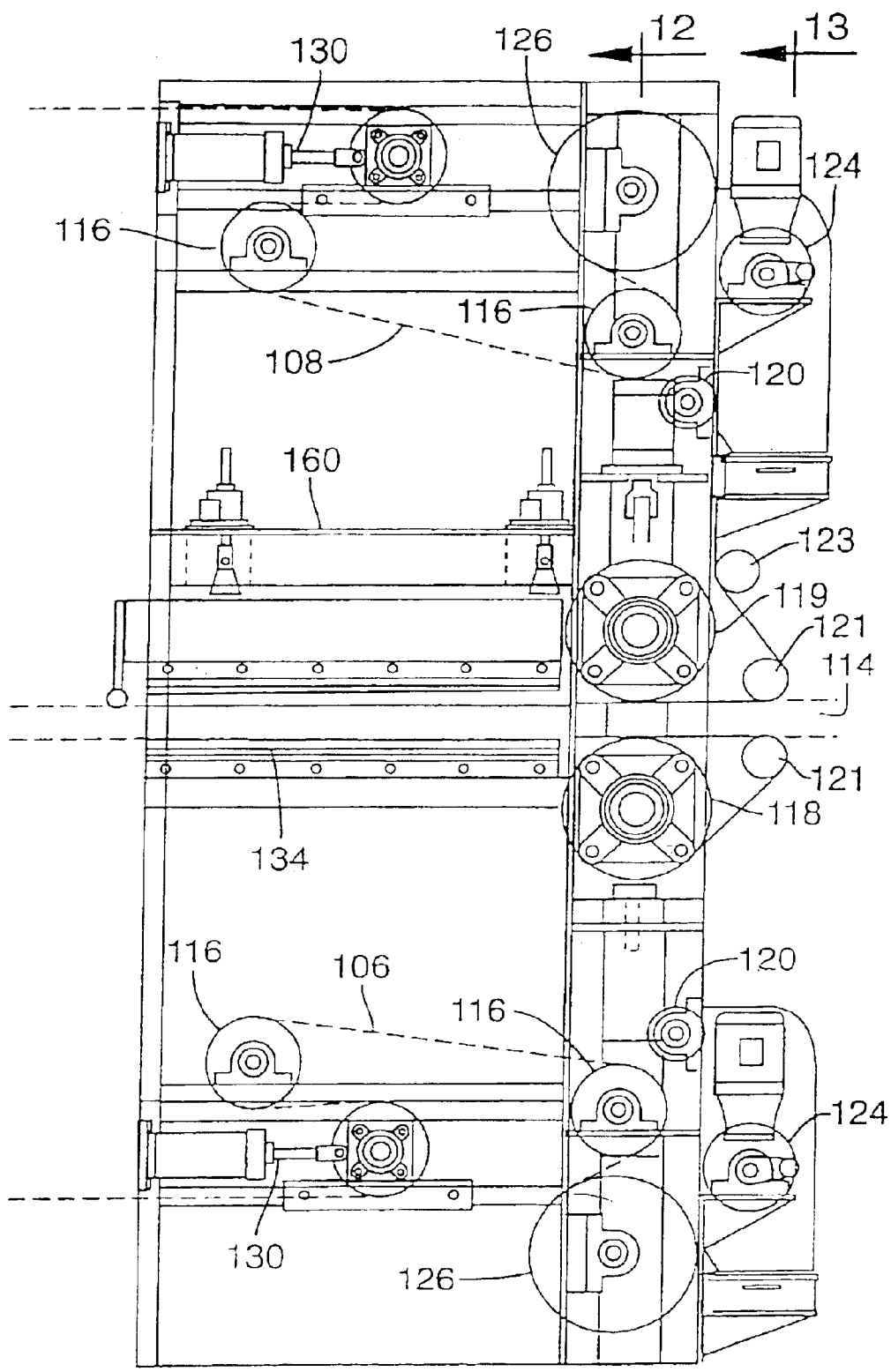
FIG. 11 is an enlarged view of the delivery end of the apparatus of FIG. 8.

A specific implementation of the consolidation apparatus is shown in FIGS. 7–14. As shown in FIGS. 8–10, a consolidation apparatus 100 has a feed end 102 through which a mat M is fed, a main body portion 103 in which the mat M is consolidated, and a delivery end 104 through which the consolidated mat M is received. A lower conveyor 106 and an upper conveyor 108, which are rotated at the same speed in a feed direction 105, contact and feed the mat M in a feed direction from the feed end 102 to the delivery end 104. The consolidation apparatus 100 also includes a hot gas distribution system 110 (FIG. 9), which is described below in greater detail.

The portion of the lower conveyor 106 that transports the mat M is positioned approximately parallel to the surface on which the consolidation apparatus 100 rests, e.g., a floor. The portion of the upper conveyor 108 that contacts and transports the mat M slopes downwardly from the feed end 102 to the delivery end 104. Thus, as the mat M is transported in the feed direction, the mat M is mechanically consolidated, i.e., pressed to a smaller thickness. In a specific implementation, the mat M had a thickness of about 7 ½ inches at the feed end 102 and a thickness of about ½ to about 4 inches (preferably ¾ inch to 1 ½ inches) at the delivery end 104. The nip at the delivery end 104 should be cooler than the mat M.

Near the feed end 102, an extended throat section having a length $L_1$ is provided to ensure sufficient back pressure for the operation of the hot gas distribution system 110 (i.e., to ensure that air is guided through the mat M rather than escaping outward through the feed end 102).

The path of the lower conveyor 106 and the upper conveyor 108 is most clearly seen in FIG. 10. The lower conveyor 106 and the upper conveyor 108 are each endless belts having a perforated surface that allows hot air from the hot gas distribution system 110 to impinge on the upper and/or lower surfaces of and to pass through the mat M. The lower conveyor 106 and the upper conveyor 108 each has a conveyor guidance system 112, a feed roller 114, idler rollers 116, and, near the delivery end 104, an idler brush 120, a rotary brush 124, a drive roller 126 and a take-up roller and pneumatic cylinder 130. The upper conveyer 108 also has a feed roller 114 positioned near the feed end 102, whereas one of the idler rollers 116 is positioned at a corresponding location for the lower conveyor 106.

Figure 12:
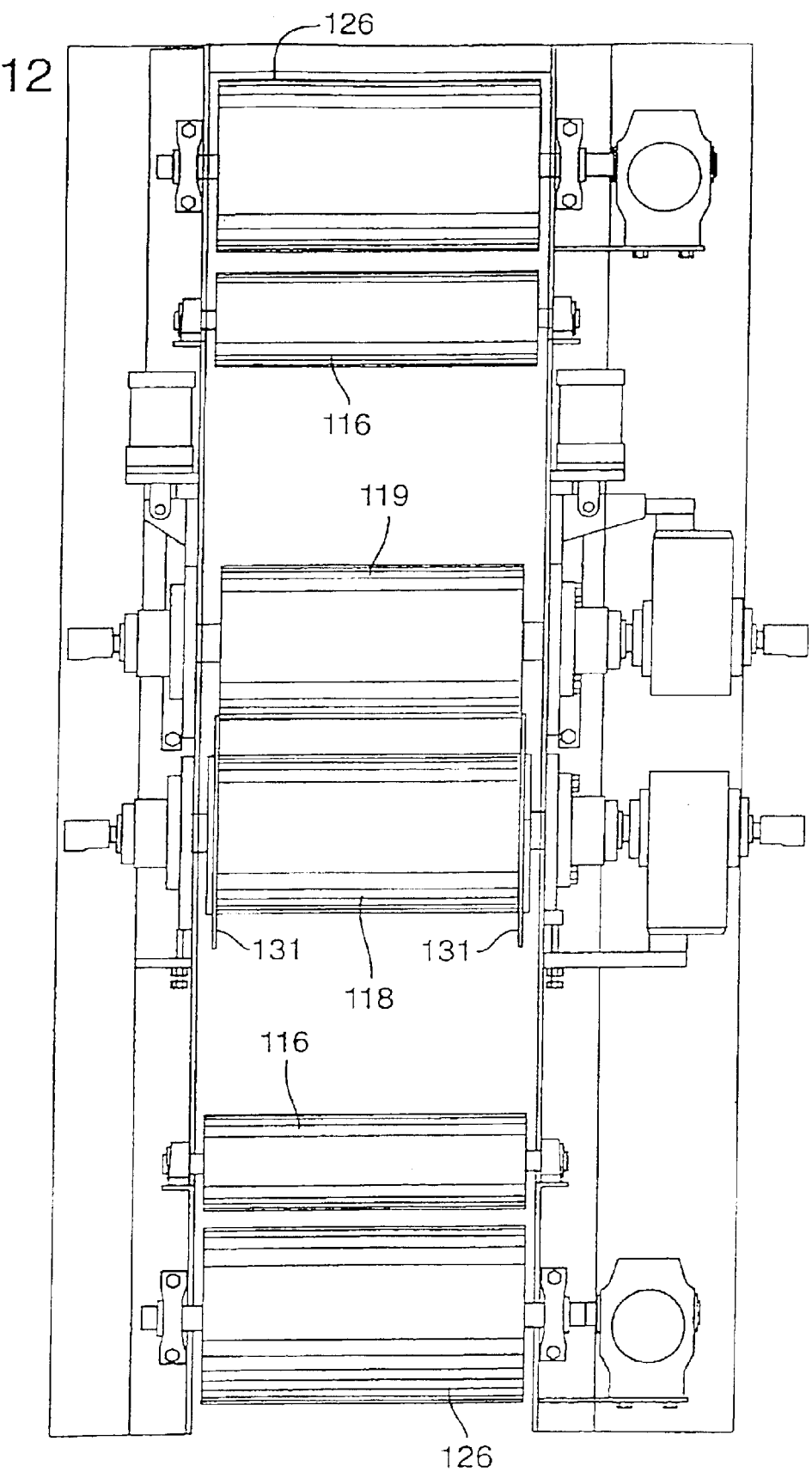
FIG. 12 is a sectional view of the apparatus of FIGS. 7, 8 and 9 taken along line 12—12 in FIG. 11.

At the delivery end 104, the lower conveyor 106 has a lower nip roller 118, and the upper conveyor 108 has an upper nip roller 119. The space between the outer peripheries of the lower nip roller 118 and the upper nip roller 119 is adjustable depending upon the desired thickness of the consolidated mat M at the delivery end 104. The lower nip roller 118 and the upper nip roller 119 are each driven and temperature controlled. As illustrated in FIG. 12, the lower nip roller has peripheral flanges 131 at its outer edges to prevent the core material from flowing outward in a direction perpendicular to the movement direction of the conveyors.

Further, at the delivery end 104, each of the lower conveyor 106 and the upper conveyor 108 has an extension roller 121 of a smaller diameter than the lower nip roller 118 and the upper nip roller 119, respectively. An auxiliary roller 123 is also provided adjacent the upper extension roller 121. The extension rollers 121 allow the lower conveyor 106 and the upper conveyor 108 to reverse direction at a lesser angle with respect to the process direction 105 than if only the lower nip roller 118 and the upper nip roller 119 were present. As a result of this lesser angle, the mat M is more readily released from the lower conveyor 106 and the upper conveyor 108 because the force to separate the conveyors from the mat M is directed more nearly parallel with the process direction 105.

Each rotary brush 124 has an element that contacts the surface of and cleans an adjacent one of the drive rollers 126. Similarly, each idler brush 120 has an element that contacts the surface of and cleans an adjacent one of the idler rollers 116. The take-up roll and pneumatic cylinder arrangement 130 allows the tension of each respective conveyor to be adjusted.

The lower conveyor 106 and the upper conveyor 108 include belt supports 128, one being shown for the lower conveyor 106. The lower conveyor 106 and the upper conveyor 108 are driven at the same speed by variable frequency drive assemblies (not shown) coupled to each of the drive rollers 126. The inclination of the upper conveyor 108, which is supported by an adjustable frame 158, can be adjusted using a lift/lower system 136.

At the delivery end 104, an exit tunnel having a length $L_2$ is formed in the space provided by the converging lower conveyor 106 and upper conveyor 108. Similar to the throat at the feed end 102, the exit tunnel provides sufficient back pressure to ensure operation of the hot gas distribution system 110.

The hot gas distribution system 110 includes one or more distribution zones. As illustrated in FIG. 9, the hot gas distribution system 110 is divided into a first distribution zone 138 and a second distribution zone 140 in the feed direction 105. As shown, a partition 142 separates and isolates the first distribution zone 138 from the second distribution zone 140, thereby preventing short-circuiting. Thus, the first distribution zone 138 and the second distribution zone 140 are not fluidly connected. Each of the first distribution zone 138 and the second distribution zone 140 has a fan 144 that is driven by a fan drive 146. Each fan 144 draws hot air or other suitable gas from a duct 148. The hot air drawn from the duct 148 is first heated by a heat exchanger 150. Each heat exchanger 150 has a hot-side heat exchange with a hot fluid (e.g., hot oil) conveyed by an inlet pipe 152 through the heat exchanger 150 and out through an outlet pipe 154. Each fan 144 conveys the hot air through a plenum 156 into the main body 103 of the consolidation apparatus 100.

As illustrated best in FIG. 9, each of the first distribution zone 138 and the second distribution 140 includes at least a pair of sliding covers for changing the airflow path in the respective zone. The pair of sliding covers for each zone are aligned in the vertical direction and located on the fan side of the conveyors at the junction of a fan chamber 153 (i.e., essentially the airflow path between the consolidation apparatus 100 and the fan 144/duct 148) and a plenum chamber 155 (i.e., essentially the airflow path between the consolidation apparatus 100 and the plenum 156).

FIG. 9 shows upper sliding covers 165, 167, the lower sliding covers being similar. In particular, FIG. 9 shows an upper sliding cover 165 for the first distribution zone 138, and an upper sliding cover 167 for the second distribution zone 140. FIG. 7 shows the upper sliding cover 167 in vertical alignment with a lower sliding cover 177 for the second distribution zone 140.

As illustrated in FIG. 9, the upper sliding covers 165, 167 can be positioned to cover one of a pair of openings 169 or 171 and 173 or 175, respectively, in the wall of the consolidation apparatus 100. The lower sliding covers are positioned to cover similar openings. For example, for the upper sliding cover 167, the opening 169 connects the fan chamber 153 and the interior of the consolidation apparatus 100, whereas the opening 171 connects the plenum chamber 155 and the interior of the consolidation apparatus 100. Typically, the upper and lower sliding covers for either zone are configured such that one of the covers is positioned to cover the opening in the respective fan chamber 153, and the other positioned to cover the opening in the respective plenum chamber 155. As a result, an air flow path through both conveyors and the mat between the conveyors is created.

According to one specific implementation, the first distribution zone 138 was configured such that air flowed from the top down through the upper conveyor 108, the mat M and the lower conveyor 106. Conversely, the second distribution zone 140 was configured such that the air flowed upwardly through the lower conveyor 106, the mat M, and the upper conveyor 108, i.e., in a direction reversed from the first distribution zone 138. Arrows A in FIG. 7 show the air flow direction in the second distribution zone 140, the air flow direction in the first distribution zone 138 being opposite the arrows A.

In this specific implementation, the upper sliding cover 165 for the first distribution zone 148 was positioned to cover the opening 171, and the lower cover for the same zone was positioned to cover the opening from the fan chamber 153 into the consolidation apparatus. As a result, an air flow path is established in the first distribution zone from the fan chamber 153 through the opening 169, into the consolidation apparatus 100 downwardly through the upper conveyor 108, mat M and lower conveyor 106 and out the plenum chamber 155 (i.e., through the opening not covered by the lower sliding cover). Conversely, the upper sliding cover 167 for the second distribution zone is slid to cover the opening 173, and the lower sliding cover 177 is slid to cover the opening from the plenum chamber 155 into the consolidation apparatus 100. As a result, an air flow path is established in the second distribution zone 150 from the fan chamber 153 through the opening into the consolidation apparatus 100 (i.e., through the opening not covered by the sliding cover 177) upwardly through the lower conveyor 106, mat M and upper conveyor 108 and out onto the plenum chamber 155 (i.e., through the opening 171).

At an air temperature of about 400° F., the time for consolidation of a 7/16 inch board product using the illustrated air flow configuration is about 60 seconds. The air flow rate in each of the first distribution zone 138 and the second distribution zone 140 is set to create a pressure differential of about 4 in $H_2O$ to about 12 in $H_2O$, and preferably about 8 in $H_2O$ to about 10 in $H_2O$. The first distribution zone 138 and the second distribution zone 140 are independent of each other, and thus the zones can be configured to convey air in the same direction or in opposite directions.

Each fan 144 includes a spark detector 164 (FIG. 9) that detects sparks, e.g., caused by excessively high temperatures and/or combustible gases in the air flow, to shut down the hot has distribution system 110.

Each of the first distribution zone 138 and the second distribution zone 140 includes an exhaust duct 149 (FIG. 7) for allowing a portion of the air in each zone to be exhausted, in which case make-up air (e.g., fresh air) is added as a replacement. In general, a major portion of the air in each zone is reheated and recycled, which makes the process more efficient. To minimize fire risk within the consolidation apparatus, however, a portion of the used air may be exhausted, which removes some VOCs, dust and fines via continuous dilution. In a specific implementation, the quantity of fresh make-up air is about 30% by volume.

Figure 23:
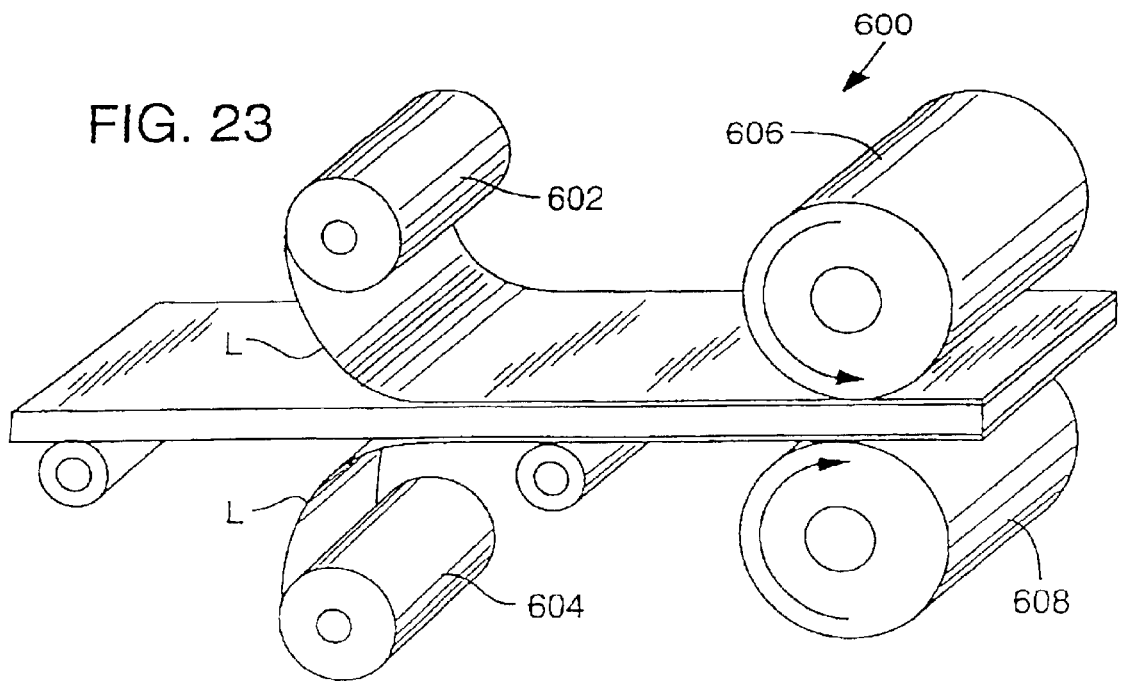
FIG. 23 is a schematic perspective view of a lamination apparatus showing laminate being applied to both major surfaces of a board product.

FIG. 23 shows a schematic representation of a specific implementation lamination apparatus 600. The lamination apparatus 600 has a pair of supply rollers 602, 604 positioned to supply laminate material L for laminating major surfaces of the product prior to pressing.

After the laminate material (e.g., polyethylene) has been applied, the product travels through a pair of heated lamination rollers 606, 608 that position the laminate L on the product and nip the product to its substantial caliper. In one implementation, a conventional Dubois 2-sided dry-film laminator operating at a roller temperature above about 250° F. was used as the lamination apparatus 600. According to the methods used in lamination, there is no discrete boundary between the applied laminate and the underlying surface.

Figure 24:
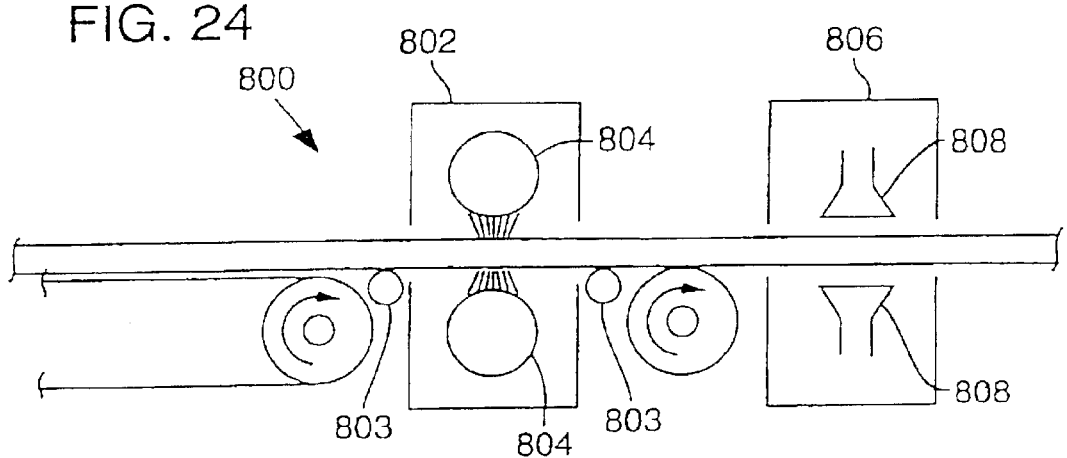
FIG. 24 is a schematic perspective view of a surface treatment apparatus showing both major surfaces of a board product being subjected to surface treatment.

Following final densification in a suitable pressing apparatus, the product is subjected to surface treatment. FIG. 24 shows a schematic representation of a surface treatment apparatus 800. As illustrated, the product travels on a belt to a flame treatment apparatus 802. At the flame treatment apparatus 802, the product transitions from the belt to small rollers 803 positioned at the entrance and exit of the flame treatment apparatus 802. Within the flame treatment apparatus 802, at least both major surfaces of the product are surface oxidized by flame treatment in a single pass by flame treatment elements 804. One suitable flame treatment apparatus is the Wise Corporation twin burner flame treater. Thereafter, the product enters a spraying station 806. Within the spraying station 806, which is conventional, at least both major surfaces of the product are sprayed with a grafting chemical by spraying elements 808.

Figure 15:
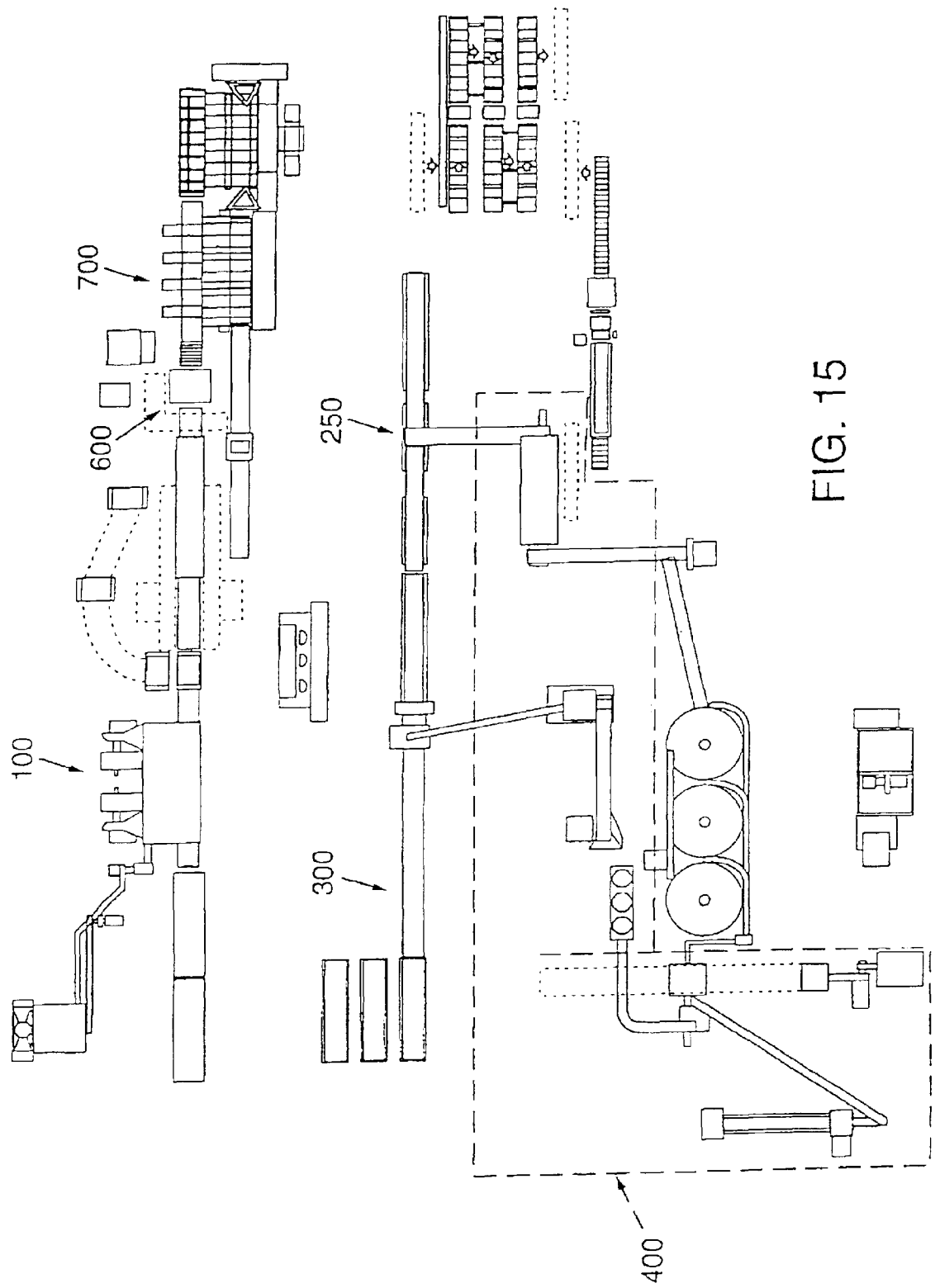
FIG. 15 is a schematic view of a process line showing apparatus for blending, conveying, face forming, consolidating, laminating, pressing and surface treating.

FIG. 15 shows a schematic production line layout 500 of the various apparatus used to produce board products according to the invention. In particular, the illustrated production line layout illustrates (1) continuous face forming in parallel with (2) continuous consolidation, lamination and pressing. As described above, flaked wood and granulated plastic are sorted and prepared described above in a material preparation and supply area 400, and then supplied to the face forming apparatus 300. Faces are formed with the face forming apparatus 300. In a parallel arrangement, board products are formed in the consolidation apparatus 100, laminated in a lamination apparatus 600 and then pressed to final dimensions in a press 700. Although not shown, an appropriate surface treatment apparatus, such as the surface treatment apparatus 800 described above, may be positioned downstream of the press 700 to continuously treat the pressed board product.

VI. EXAMPLES

The following examples are provided solely to illustrate certain particular features of the present invention, but the invention should not be limited to the particular features described.

Example 1

This example describes the formation of a $7/16$-inch-thick composite product having a density of about 50 pounds/ft$^3$ and comprising about 50% waste polyethylene. Waste thermoplastic material, primarily polyethylene, but perhaps containing minor fractions of other thermoplastic materials, and wood were comminuted into flakes. A mixture was then formed by hand comprising about 115 grams of comminuted thermoplastic material and about 126 grams of wood flakes having a moisture content of about 9.8%. This mixture was then placed in a containment bin for thermal consolidation in a batch hot-air consolidation apparatus that uses the principles of the apparatuses illustrated in FIGS. 3–6, the batch apparatus having only one cell for applying hot air to the entire area of one surface of the mixture in the containment bin. Hot air at a temperature of about 400° F. was applied to the mixture generally at a pressure of less than about 1–2 psig for a period of about 1 minute. The thermally consolidated mixture was removed from the consolidation apparatus and pressed to its final density in a conventional platen press at a pressure of about 550 psig.

Example 2

Composite products made in accordance with the present invention may advantageously be overlaid with a paper sheet or material, a plastic sheet or material, or both. For example, portions of the cellulosic material may extend upwardly from the surface of the board product, which is referred to herein as telegraphing. Overlaying the board product with a paper sheet or material, a plastic sheet or material, or both, solves problems associated with telegraphing. The present example describes the formation of a board product having an overlying layer of a thermoplastic material.

A board product was made as substantially described in Example 1. A 2 millimeter-thick sheet of low density polyethylene was then placed on each major opposing surface of a warm composite product after thermal consolidation. The overlaid product was then pressed for a period of about 2 minutes at about 550 psig in a conventional heated platen press heated to a temperature of about 275°.

Example 3

This example describes the formation of a $7/16$-inch-thick three-layer board product having a core between two outer layers comprising filler and thermoplastic fines. A first mixture was made comprising 17 grams of thermoplastic material fines, primarily polyethylene, and 18 grams wood fines having a moisture content of about 11.1%. This mixture was formed into a mat in a containment bin. A second mixture for the product's core was then made comprising about 82 grams thermoplastic material and 102 grams cellulosic wood flakes having a moisture content of about 12.42%. This mixture was formed into a mat on top of the mat situated in the containment bin. Finally, a third layer substantially identical to the first layer was placed on top of the core layer in the containment bin.

Air at a temperature of about 400° F. was applied to the mixture at a pressure of about 1–2 psig for a period of about 1 minute. The thermally consolidated mixture was removed from the consolidation apparatus and pressed to its final density at a pressure of about 550 psig using a conventional platen press.

Example 4

This example describes the formation of a $7/16$-inch-thick three-layer board product having a core between two outer layers comprising fines, the board product being overlaid with a plastic layer. A three-layer board product was made substantially as described above in Example 3. A 0.002-inch-thick sheet of low density polyethylene was then placed on each major opposing surface of the board product after thermal consolidation. The overlaid product was then pressed in a conventional platen press at a pressure of about 550 psig and a temperature of about 275° for a period of about 2 minutes.

Example 5

This example describes the formation of a $7/16$ inch board having a density of about 50 pounds/ft$^3$ and comprising about 50% polyethylene, the board product being surface modified and painted. A board product was made substantially as described above in Example 1. The surface of the product was subjected to corona discharge to oxidize the surface of the product (products also have been made where the surface of the product was oxidized by flame treatment). A solution, such as an aqueous solution, an organic solution, particularly alcoholic solutions, and most typically an aqueous/organic solution (e.g., water and alcohol) of surface-modifying agents, such as silanes, ketonates, zirconates, amines, chromium compounds, etc., was applied to the product. The surface-modified composite product was then painted and allowed to dry.

The adhesion of the paint to the composite product was then tested using an Elcometer according to ASTM D4541-89 and compared to products that had not been surface modified. These tests showed a significant improvement in the wet and dry adhesion of the surface modified and painted product as shown in Table 1. Wet adhesion involved exposure to condensed humidity conditions for one week and one month at 60° C.

TABLE 1

Dry and Wet Adhesion on a Polyethylene Surface (Pull-off Strength in MPa)

| Treatment | Dry | Wet (1 week) | Wet (1 month) |
|---|---|---|---|
| Untreated | 0 | 0 | 0 |
| Corona only | 1.9 ± 0.1 | 2.1 ± 0.8 | 1.8 ± 0.8 |
| Corona plus graft | 3.1 ± 0.4 | 2.3 ± 0.6 | 2.3 ± 0.3 |

Further tests showed that for flame treated material, the non-surface-modified and painted product fails at the paint-product interface. Surface-modified products exhibited a large percentage of cohesive failure of the product itself, not at the paint-product interface. See Table 2.

TABLE 2

Surface Treatment and Graft Chemical Application on Cohesive Failure (% CFS)

| Treatment | Pull-off Strength (MPa) | % CFS |
|---|---|---|
| Flame only | 2.1 ± 0.5 | 18 |
| Flame plus graft | 2.7 ± 0.2 | 68 |

Example 6

This example discusses the production of composite products having crosslinked thermoactive materials. Waste thermoplastic material, primarily polyethylene, and wood were comminuted into flakes.

A solution (0.5 g/ml in hexanes) comprising various percents of peroxide crosslinking agents, in this example dicumyl peroxide, by weight of the thermoplastic material as indicated below in Table 1 was sprayed onto the thermoplastic material. A mixture was then formed by hand comprising about 115 grams of the comminuted thermoplastic material (after soaking in the crosslinking agent solution) and about 126 grams of wood flakes having a moisture content of about 9.8%. This mixture was then placed in a containment bin for thermal consolidation. Hot air was applied to the mixture at a pressure of about 1–2 psig and a temperature of about 400EF in the consolidation apparatus for a period of about 1 minute. The thermally consolidated mixture was removed from the consolidation apparatus and pressed to its final density at a pressure of about 550 psig using a conventional platen press.

The creep rate (displacement/time) of the products made according to this example was then determined with respect to the gel fraction of the product, which indicates the percent crosslinking that occurred with the thermoactive material. The gel fraction was determined according to ASTM D2765-95 modified to account for the wood in the composite, where the wood was treated as a filler in the method. For purposes of comparison, the creep rate for a product made without crosslinking the thermoactive material was measured as being $4.76 \times 10^{-4}$ mm/minute at a load of 50 Newtons. Loads for normal use of the product are expected to be about 0.1 to about 5 Newtons. Composite products made according to the method of the present invention and having crosslinked thermoactive material had substantially reduced creep rates as shown by Table 3.

TABLE 3

| Peroxide Addition | Gel Fraction (% of plastic) | Creep Improvement (%) |
|---|---|---|
| 0 | 0 | — |
| 2 | 33 ± 3 | 84 |
| 6 | 30 ± 4 | 78 |

Example 7

This example further discusses the production of composite products having crosslinked thermoactive materials. Waste thermoplastic material, primarily polyethylene, and wood were comminuted into flakes. A mixture was then formed by hand comprising about 115 grams of comminuted thermoplastic material and about 126 grams of wood flakes having a moisture content of about 9.8%. This mixture was then placed in a containment bin for thermal consolidation. Hot air was applied to the mixture at a pressure of about 1–2 psig and a temperature of about 400EF in the consolidation apparatus for a period of about 1 minute. The thermally consolidated mixture was removed from the consolidation apparatus and pressed to its final density at a pressure of about 550 psig using a conventional platen press.

The composite product was then subjected to electron-beam (E-beam) treatment to crosslink the thermoplastic material. The E-beam crosslinking was done by E-beam Services of Cranberry, N.J., but also could be done by other entities, such as the Atomic Energy Commission Laboratory, Whiteshell, Manitoba, Canada. The product can be subjected to E-beam treatment at any time following thermal consolidation, but typically is best accomplished while the product is still warm. Various E-beam doses in Mrads were tried. The creep rate (displacement/time) of the products made according to this example was then determined with respect to the gel fraction of the product. The gel fraction again was determined according to ASTM D2765-95 modified to account for the wood in the composite, where the wood was treated as a filler in the method.

The percent decrease in creep relative to a non-crosslinked composite product was determined, as summarized below in Table 4. These results are substantially similar to the results presented for chemically crosslinked substrates. E-beam likely will be a preferred process for commercial production because it can be implemented less expensively than can chemical crosslinking.

TABLE 4

| E-Beam Dose (Mrads) | Gel Fraction (% of plastic) | Creep Improvement (%) |
|---|---|---|
| 0 | 0 | — |
| 6 | 40 ± 4 | 85 |
| 16 | 60 ± 4 | 86 |

Example 8

Figure 25:
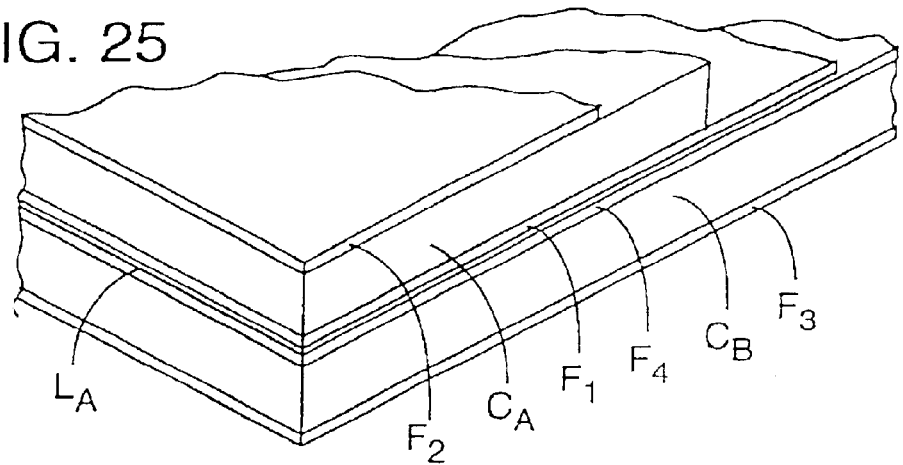
FIG. 25 is a partial perspective view of a board product made by joining two previously formed board products together.

As shown in FIG. 25, a first board product having a first face $F_1$, a core $C_A$ and a second face $F_2$ can be joined using a conventional adhesive $L_A$ to a second board product having a first face $F_3$, a core $C_B$ and a second face $F_4$. Depending upon the particular adhesive used, the surfaces to be adhered may have to be flame treated and sprayed with a grafting chemical. With conventional epoxy, normally only flame treatment would be required. Alternatively, the faces can be joined with a molten layer of polyethylene that would bond the two board products together upon cooling.

The first board product and the second board product may have the same or different dimensions. As one example, if the illustrated first and second board products each have a thickness of 7/16 inch, then a 7/8 inch board product can be formed by joining the first and second board product together at one of their respective major surfaces.

In this particular example, the first board product and the second board product were surface modified using flame treatment, and the modified surfaces were joined using a Durobond two-part epoxy applied by hand. The assembly was clamped and allowed to cure overnight. The assembly was then exposed to water for 2 days and outdoor weathering for one week. No delamination occurred.

Example 9

Figure 26:
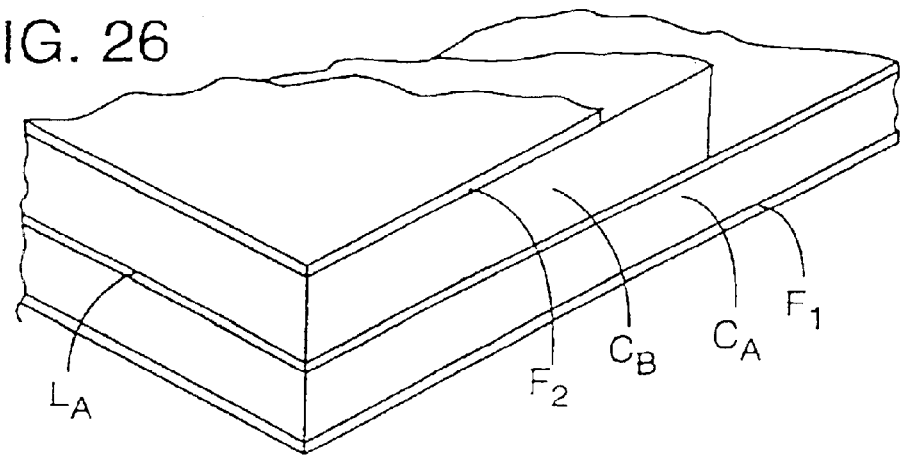
FIG. 26 is a partial perspective view of a board product made by joining two previously formed board products together at their core sides.

As shown in FIG. 26, a first board product having a first face $F_1$ and a core $C_A$ was joined using a conventional adhesive $L_A$ to a second board product having a core $C_B$ and a second face $F_2$, at the intersection of the core $C_A$ and the core $C_B$, consistent with the description in Example 8.

The present invention has been described in accordance with preferred embodiments. However, it will be understood that certain substitutions and alterations may be made thereto without departing from the spirit and scope of the invention.

We claim:

1. A single-layered cellulosic and waste thermoplastic composite product comprising a first surface and a second surface, the product having longer cellulosic flakes oriented substantially in a first direction and positioned adjacent the first and second surfaces and continuously graduating from both the first surface and the second surface to shorter cellulosic flakes at a center portion of the product.

2. A cellulosic and waste thermoplastic composite product, comprising:

a single-layered cellulosic and waste thermoplastic composite core comprising a first surface and a second surface, the core having longer cellulosic flakes oriented substantially in a first direction and positioned adjacent the first and second surfaces and continuously graduating from both the first surface and the second surface to shorter cellulosic flakes at a center portion of the core; and a cellulosic fines layer adjacent the first and second surfaces having a thickness of from about 1/48 inch to about 3/4 inch.

3. The product according to claim 2 further comprising a cellulosic fines layer adjacent the first and second surfaces having a thickness of from about 1/36 inch to about 1/4 inch.

* * * * *